US012625342B2

(12) United States Patent
Su et al.

(10) Patent No.: US 12,625,342 B2
(45) Date of Patent: May 12, 2026

(54) IMAGING LENS ASSEMBLY, CAMERA MODULE AND ELECTRONIC DEVICE

(71) Applicant: LARGAN PRECISION CO., LTD., Taichung City (TW)

(72) Inventors: Heng-Yi Su, Taichung City (TW); Ming-Ta Chou, Taichung City (TW); Wen-Yu Tsai, Taichung City (TW); Jyun-Jia Cheng, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 561 days.

(21) Appl. No.: 18/177,179

(22) Filed: Mar. 2, 2023

(65) Prior Publication Data

US 2023/0305261 A1 Sep. 28, 2023

Related U.S. Application Data

(60) Provisional application No. 63/323,104, filed on Mar. 24, 2022.

(51) Int. Cl.
*G02B 7/02* (2021.01)

(52) U.S. Cl.
CPC ........ *G02B 7/021* (2013.01); *G02B 2207/101* (2013.01)

(58) Field of Classification Search
CPC ......... G02B 7/02; G02B 7/021; G02B 7/022; G02B 7/023; G02B 7/025; G02B 7/026; G02B 1/11; G02B 27/0018
See application file for complete search history.

(56) References Cited

U.S. PATENT DOCUMENTS

| | | | |
|---|---|---|---|
| 8,547,639 B2 | 10/2013 | Watanabe et al. |
| 8,747,991 B2 | 6/2014 | Ohyanagi et al. |
| 9,809,714 B2 | 11/2017 | Kubota |
| 9,864,107 B2 | 1/2018 | Momoki |
| 9,946,047 B2 | 4/2018 | Lin et al. |

(Continued)

FOREIGN PATENT DOCUMENTS

| | | |
|---|---|---|
| CN | 107290806 A | 10/2017 |
| JP | H11320743 A | 11/1999 |

(Continued)

*Primary Examiner* — Ephrem Z Mebrahtu
(74) *Attorney, Agent, or Firm* — McClure, Qualey & Rodack, LLP

(57) ABSTRACT

An imaging lens assembly includes a plurality of optical elements and a lens barrel. At least one optical element of the optical elements is a lens element. The lens element includes an optical effective portion, a peripheral portion, a light-blocking coating layer and a nanostructure layer. The light-blocking coating layer is disposed on at least one surface of the object-side peripheral surface and the image-side peripheral surface and includes a tapered portion. The tapered portion is tapered adjacent to a boundary between the optical effective portion and the peripheral portion. The nanostructure layer is disposed on the optical effective portion and the tapered portion of the light-blocking coating layer, and the nanostructure layer has a plurality of irregular ridge-shaped protrusions. The tapered portion of the light-blocking coating layer forms a light-passing opening adjacent to the boundary along a direction surrounding the optical axis.

34 Claims, 29 Drawing Sheets

(56)            References Cited

U.S. PATENT DOCUMENTS

| | | | |
|---|---|---|---|
| 10,228,493 | B2 | 3/2019 | Kawasaki |
| 10,444,464 | B2 | 10/2019 | Lin et al. |
| 2012/0229906 | A1 | 9/2012 | Miyahara et al. |
| 2015/0103226 | A1* | 4/2015 | Takahashi .............. G02B 1/118 |
| | | | 348/335 |
| 2015/0177419 | A1 | 6/2015 | Chu et al. |
| 2016/0011415 | A1 | 1/2016 | Takada |
| 2019/0196065 | A1* | 6/2019 | Chien .................. C09D 143/04 |
| 2021/0036265 | A1 | 2/2021 | Fleischman et al. |
| 2021/0088752 | A1* | 3/2021 | Tang ....................... G03B 5/00 |
| 2021/0165136 | A1 | 6/2021 | Tsai et al. |
| 2021/0239881 | A1* | 8/2021 | Choi ...................... G02B 7/021 |
| 2022/0363915 | A1* | 11/2022 | Schulz ................ C23C 14/5873 |

FOREIGN PATENT DOCUMENTS

| | | | |
|---|---|---|---|
| JP | 2010156893 | A | 7/2010 |
| JP | 2012063393 | A | 3/2012 |
| JP | 5016872 | B2 | 9/2012 |
| JP | 2012189846 | A | 10/2012 |
| JP | 2013114103 | A | 6/2013 |
| JP | 5711921 | B2 | 5/2015 |
| JP | 5807139 | B2 | 11/2015 |
| JP | 2016080865 | A | 5/2016 |
| JP | 2019003072 | A | 1/2019 |
| TW | M486779 | U | 9/2014 |
| TW | 201525554 | A | 7/2015 |
| TW | I628484 | B | 7/2018 |
| TW | I707169 | B | 10/2020 |

* cited by examiner

470

460

IMAGING LENS ASSEMBLY, CAMERA MODULE AND ELECTRONIC DEVICE

RELATED APPLICATIONS

This application claims priority to US Provisional Application Ser. No. 63/323,104, filed Mar. 24, 2022, which is herein incorporated by reference.

BACKGROUND

Technical Field

The present disclosure relates to an imaging lens assembly, a camera module and an electronic device. More particularly, the present disclosure relates to a compact imaging lens assembly, a compact camera module and a portable electronic device.

Description of Related Art

In recent years, portable electronic devices have developed rapidly. For example, intelligent electronic devices and tablets have been filled in the lives of modern people, and camera modules mounted on the portable electronic devices have also prospered. However, as technology advances, the quality requirements of the electronic devices and the camera modules thereof are becoming higher and higher. Therefore, an imaging lens assembly, a camera module and an electronic device, which are simultaneously featured with compact sizes and the image quality, needs to be developed.

SUMMARY

According to one aspect of the present disclosure, an imaging lens assembly includes a plurality of optical elements and a lens barrel. An optical axis passes through the optical elements, and at least one optical element of the optical elements is a lens element. The lens barrel accommodates the optical elements. The lens element includes an optical effective portion, a peripheral portion, a light-blocking coating layer and a nanostructure layer. The optical axis passes through the optical effective portion, which includes an object-side optical effective surface and an image-side optical effective surface. The object-side optical effective surface faces an object side of the imaging lens assembly. The image-side optical effective surface faces an image side of the imaging lens assembly and is disposed oppositely to the object-side optical effective surface. The peripheral portion surrounds the optical effective portion and includes an object-side peripheral surface, an image-side peripheral surface and an outer diameter surface. The object-side peripheral surface faces the object side of the imaging lens assembly. The image-side peripheral surface faces the image side of the imaging lens assembly and is disposed oppositely to the object-side peripheral surface. The outer diameter surface is connected to the object-side peripheral surface and the image-side peripheral surface. The light-blocking coating layer is disposed on at least one surface of the object-side peripheral surface and the image-side peripheral surface and includes a tapered portion. The tapered portion is tapered toward a center of the optical effective portion, and the tapered portion is tapered adjacent to a boundary between the optical effective portion and the peripheral portion. The nanostructure layer is disposed on the optical effective portion and the tapered portion of the light-blocking coating layer, and the nanostructure layer has a plurality of irregular ridge-shaped protrusions. The tapered portion of the light-blocking coating layer forms a light-passing opening adjacent to the boundary along a direction surrounding the optical axis. When a roundness tolerance of the light-passing opening is t, the following condition is satisfied: t<0.02 mm.

According to another aspect of the present disclosure, a camera module includes the imaging lens assembly according to the foregoing aspect.

According to another aspect of the present disclosure, an electronic device includes the camera module according to the foregoing aspect, and the camera module further includes an image sensor, which is disposed on an imaging surface of the camera module.

According to another aspect of the present disclosure, an imaging lens assembly includes a plurality of optical elements and a lens barrel. An optical axis passes through the optical elements, and at least one optical element of the optical elements is a lens element. The lens barrel accommodates the optical elements. The lens element includes an optical effective portion, a peripheral portion, a light-blocking coating layer, a nanostructure layer and at least one axial connection structure. The optical axis passes through the optical effective portion, which includes an object-side optical effective surface and an image-side optical effective surface. The object-side optical effective surface faces an object side of the imaging lens assembly. The image-side optical effective surface faces an image side of the imaging lens assembly and is disposed oppositely to the object-side optical effective surface. The peripheral portion surrounds the optical effective portion and includes an object-side peripheral surface, an image-side peripheral surface and an outer diameter surface. The object-side peripheral surface faces the object side of the imaging lens assembly. The image-side peripheral surface faces the image side of the imaging lens assembly and is disposed oppositely to the object-side peripheral surface. The outer diameter surface is connected to the object-side peripheral surface and the image-side peripheral surface. The light-blocking coating layer is disposed on at least one surface of the object-side peripheral surface and the image-side peripheral surface and includes a tapered portion. The tapered portion is tapered toward a center of the optical effective portion, and the tapered portion is tapered adjacent to a boundary between the optical effective portion and the peripheral portion. The nanostructure layer is disposed on the optical effective portion and the tapered portion of the light-blocking coating layer, and the nanostructure layer has a plurality of irregular ridge-shaped protrusions. The lens barrel includes an axial alignment structure, which is connected to the at least one axial connection structure so as to cause the lens element to align the optical axis. The tapered portion of the light-blocking coating layer forms a light-passing opening adjacent to the boundary along a direction surrounding the optical axis. When a roundness tolerance of the light-passing opening is t, the following condition is satisfied: t<0.02 mm.

According to another aspect of the present disclosure, an imaging lens assembly includes a plurality of optical elements and a lens barrel. An optical axis passes through the optical elements, and at least one optical element of the optical elements is a lens element. The lens barrel accommodates the optical elements. The lens element includes an optical effective portion, a peripheral portion, a light-blocking coating layer and a nanostructure layer. The optical axis passes through the optical effective portion, which includes an object-side optical effective surface and an image-side optical effective surface. The object-side optical effective surface faces an object side of the imaging lens assembly.

The image-side optical effective surface faces an image side of the imaging lens assembly and is disposed oppositely to the object-side optical effective surface. The peripheral portion surrounds the optical effective portion and includes an object-side peripheral surface, an image-side peripheral surface and an outer diameter surface. The object-side peripheral surface faces the object side of the imaging lens assembly. The image-side peripheral surface faces the image side of the imaging lens assembly and is disposed oppositely to the object-side peripheral surface. The outer diameter surface is connected to the object-side peripheral surface and the image-side peripheral surface. The light-blocking coating layer is disposed on at least one surface of the object-side peripheral surface and the image-side peripheral surface and includes a tapered portion. The tapered portion is tapered toward a center of the optical effective portion, and the tapered portion is tapered adjacent to a boundary between the optical effective portion and the peripheral portion. The nanostructure layer is disposed on the optical effective portion and the tapered portion of the light-blocking coating layer, and the nanostructure layer has a plurality of irregular ridge-shaped protrusions. The tapered portion of the light-blocking coating layer forms a light-passing opening adjacent to the boundary along a direction surrounding the optical axis.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1A:
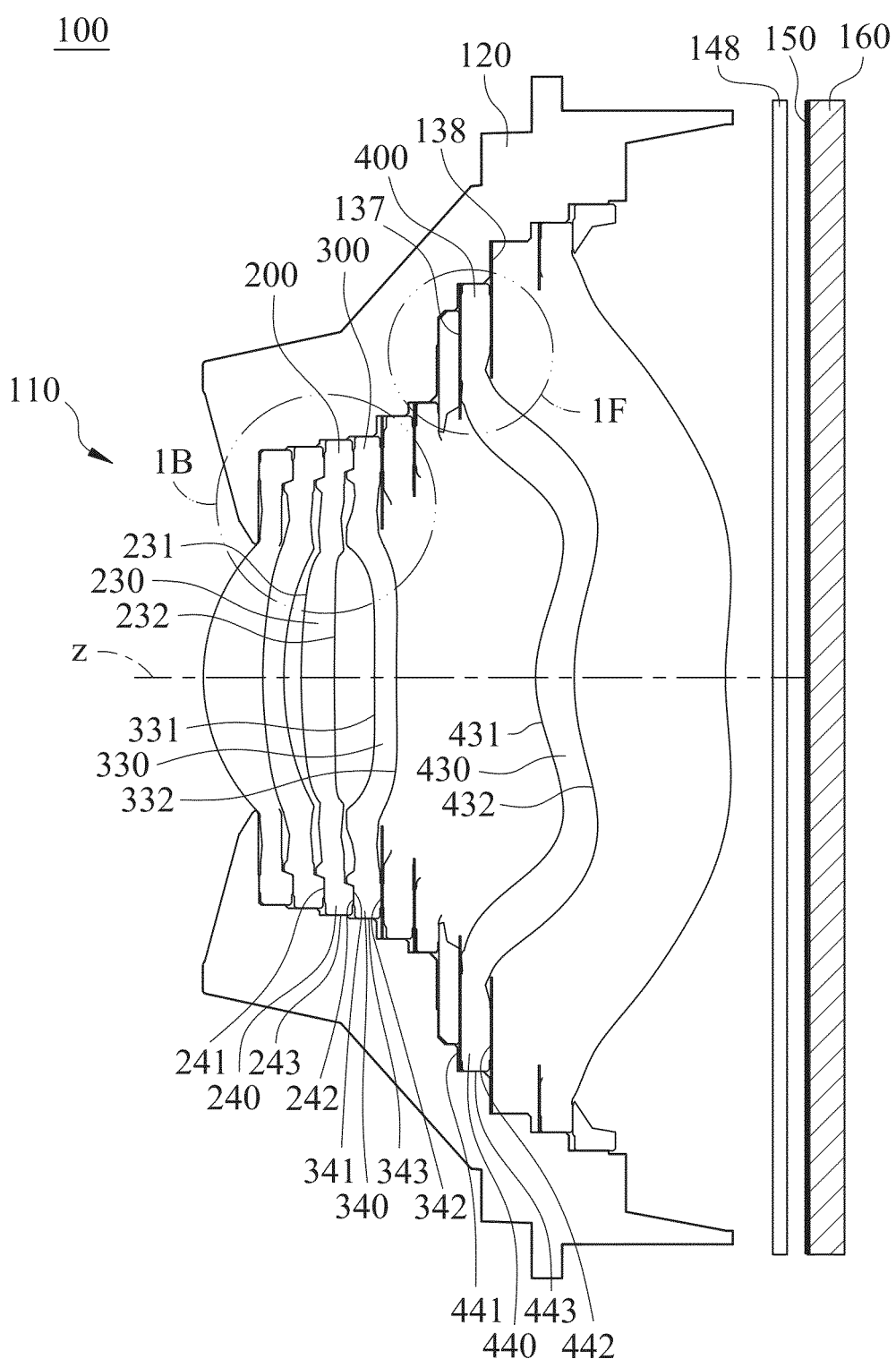
FIG. 1A is a schematic view of a camera module according to the 1st embodiment of the present disclosure.

According to one aspect of the present disclosure, an imaging lens assembly is provided. The imaging lens assembly includes a plurality of optical elements and a lens barrel. An optical axis passes through the optical elements, and at least one optical element of the optical elements is a lens element. The lens barrel accommodates the optical elements. The lens element includes an optical effective portion, a peripheral portion, a light-blocking coating layer and a nanostructure layer. The optical axis passes through the optical effective portion, which includes an object-side optical effective surface and an image-side optical effective surface. The object-side optical effective surface faces an object side of the imaging lens assembly. The image-side optical effective surface faces an image side of the imaging lens assembly and is disposed oppositely to the object-side optical effective surface. The peripheral portion surrounds the optical effective portion and includes an object-side peripheral surface, an image-side peripheral surface and an outer diameter surface. The object-side peripheral surface faces the object side of the imaging lens assembly. The image-side peripheral surface faces the image side of the imaging lens assembly and is disposed oppositely to the object-side peripheral surface. The outer diameter surface is connected to the object-side peripheral surface and the image-side peripheral surface. The light-blocking coating layer is disposed on at least one surface of the object-side peripheral surface and the image-side peripheral surface and includes a tapered portion. The tapered portion is tapered toward a center of the optical effective portion, and the tapered portion is tapered adjacent to a boundary between the optical effective portion and the peripheral portion. The nanostructure layer is disposed on the optical effective portion and the tapered portion of the light-blocking coating layer, and the nanostructure layer has a plurality of irregular ridge-shaped protrusions. The tapered portion of the light-blocking coating layer forms a light-passing opening adjacent to the boundary along a direction surrounding the optical axis. When a roundness tolerance (i.e., a tolerance of a roundness) of the light-passing opening is t, the following condition is satisfied: t<0.02 mm. Therefore, the mentioned aspect is an anti-reflection manner of the light-blocking coating layer and the nanostructure layer disposed/processed in order on the surface of the lens element. The nanostructure layer disposed on the tapered portion of the light-blocking coating layer is favorable for reducing light reflections on the light-passing opening of the tapered portion so as to improve the image quality.

Furthermore, the light-blocking coating layer may be a black ink layer formed by a quick-drying ink based on epoxy resin, a blackened coating layer of chemical vapor deposition, or a photoresistive coating layer, etc., but is not limited thereto. The irregular ridge-shaped protrusions observed from the cross-section appear in the form of a wide bottom and a narrow top like a ridge, so that the equivalent refractive index of the nanostructure layer can decrease from the bottom to the top thereof, thereby destroying and reducing the reflected light. The light-passing opening formed by the light-blocking coating layer has a measurable roundness, which means that the accuracy of the coating technique of the light-blocking coating layer can be controlled. The boundary/junction between the optical effective portion and the peripheral portion may appear a ridge line that can be clearly identified by naked eyes, but is not limited thereto. The boundary may appear a convex step appearance. The convex step appearance is formed by extending from the respective surfaces of the optical effective portion and the peripheral portion and intersecting each other, and there is a ridge line at the boundary, but it is not limited thereto. The so-called "adjacent to a/the boundary" indicates a range of +/−0.03 mm from the ridge line of the boundary.

In detail, each of the object-side optical effective surface and the image-side optical effective surface of the optical effective portion may be a smooth surface, and the surface of the peripheral portion on which the light-blocking coating layer is disposed may be a smooth surface. Therefore, it is favorable for improving the fluidity of the light-blocking coating layer while coating it on the surface of the peripheral portion, so that the light-blocking position of the light-blocking coating layer and the roundness of the light-passing opening can be accurately controlled. The so-called "smooth surface" indicates the surface with a surface roughness of Ra<0.1 um (micrometer).

An average height of the nanostructure layer may be between 90 nm and 350 nm, and the height range of the nanostructure layer is set for disaffecting the image quality and simultaneously having better anti-reflection effects. Furthermore, the average height of the nanostructure layer may be between 125 nm and 300 nm, and the height range of the nanostructure layer is set for disaffecting the image quality and simultaneously having better anti-reflection effects. In addition, the average height of the nanostructure layer may be between 195 nm and 255 nm. The material of the nanostructure layer includes aluminum oxide ($Al_2O_3$). When the average height of the nanostructure layer is close to 200 nm, there is a better anti-reflection effect for the incident light under specific conditions, but it not limited thereto.

When the roundness tolerance of the light-passing opening is t, the following condition may be satisfied: t<0.01 mm. Therefore, it is favorable for replacing a light-blocking performance of a conventional light-blocking sheet with the light-blocking coating layer. Furthermore, the following condition may be satisfied: t<0.005 mm. Therefore, it is favorable for meeting the requirement of a more accurate light-blocking position.

The lens element may further include a connecting structure layer, which is disposed between the nanostructure layer and the optical effective portion, and between the nanostructure layer and the peripheral portion. Therefore, the connecting structure layer is advantageous in making the lens element and the nanostructure layer tightly bonded, thereby achieving higher structural stability. It can be said that the nanostructure layer is disposed on the topmost layer of the connecting structure layer. For example, with reference to FIG. 1R, FIG. 1S and FIG. 1T, there are the nanostructure layer, the connecting structure layer and the optical effective portion from top to bottom in order in a cross-sectional image observed with the electron microscope. The connecting structure layer may be composed of and stacked alternately by a plurality of coating layers with different refractive indices, and the connecting structure layer includes at least one silicon dioxide ($SiO_2$) coating layer. The surface of the nanostructure layer has a plurality of hole structures. For example, as shown in FIG. 1P and FIG. 1Q, the top view of the distribution of the nanostructure layer on the lens element is observed with the electron microscope, and the surface of the nanostructure layer has a plurality of hole structures. Parts of the connecting structure layer are exposed from the hole structures, and the exposed parts of the connecting structure layer are in contact with air.

The light-blocking coating layer may be further disposed on the outer diameter surface. Therefore, the light-blocking range of the light-blocking coating layer is extended so as to ensure the light-blocking effect for the non-imaging light on the outer diameter surface.

The light-blocking coating layer may be disposed on the object-side peripheral surface, the image-side peripheral surface and the outer diameter surface. Therefore, the light-blocking range of the light-blocking coating layer is extended so as to replace other adjacent optical element (e.g., a light-blocking sheet) having the same function, thereby reducing the production costs. The light-blocking coating layer coated on the entire peripheral portion is favorable for providing better light-blocking effect, but is not limited thereto.

The lens element may further include at least one axial connection structure, which is configured for connecting to another optical element of the optical elements adjacent thereto, and for aligning the optical axis with the another optical element adjacent thereto. The two adjacent optical elements (i.e., the lens element and the another optical element) are fitted and assembled with each other, so as to align the optical axis and improve the resolution of the imaging lens assembly.

The light-blocking coating layer may be extended from the outer diameter surface to the at least one axial connection structure. Therefore, the light-blocking requirements of the position of the axial connection structure are satisfied so as to improve the image quality.

According to another aspect of the present disclosure, a camera module is provided. The camera module includes the imaging lens assembly according to the foregoing aspect.

According to another aspect of the present disclosure, an electronic device is provided. The electronic device includes the camera module according to the foregoing aspect, and the camera module further includes an image sensor, which is disposed on an imaging surface of the camera module (i.e., an imaging surface of the imaging lens assembly).

According to another aspect of the present disclosure, an imaging lens assembly is provided. The imaging lens assembly includes a plurality of optical elements and a lens barrel. An optical axis passes through the optical elements, and at least one optical element of the optical elements is a lens element. The lens barrel accommodates the optical elements. The lens element includes an optical effective portion, a peripheral portion, a light-blocking coating layer, a nanostructure layer and at least one axial connection structure. The optical axis passes through the optical effective portion, which includes an object-side optical effective surface and an image-side optical effective surface. The object-side optical effective surface faces an object side of the imaging lens assembly. The image-side optical effective surface faces an image side of the imaging lens assembly and is disposed oppositely to the object-side optical effective surface. The peripheral portion surrounds the optical effective portion and includes an object-side peripheral surface, an image-side peripheral surface and an outer diameter surface. The object-side peripheral surface faces the object side of the imaging lens assembly. The image-side peripheral surface faces the image side of the imaging lens assembly and is disposed oppositely to the object-side peripheral surface. The outer diameter surface is connected to the object-side peripheral surface and the image-side peripheral surface. The light-blocking coating layer is disposed on at least one surface of the object-side peripheral surface and the image-side peripheral surface and includes a tapered portion. The tapered portion is tapered toward a center of the optical effective portion, and the tapered portion is tapered adjacent to a boundary between the optical effective portion and the peripheral portion. The nanostructure layer is disposed on the optical effective portion and the tapered portion of the light-blocking coating layer, and the nanostructure layer has a plurality of irregular ridge-shaped protrusions. The lens barrel includes an axial alignment structure, which is connected to the at least one axial connection structure so as to cause the lens element to align the optical axis. The tapered portion of the light-blocking coating layer forms a light-passing opening adjacent to the boundary along a direction surrounding the optical axis. When a roundness tolerance of the light-passing opening is t, the following condition is satisfied: $t<0.02$ mm.

In detail, each of the object-side optical effective surface and the image-side optical effective surface of the optical effective portion may be a smooth surface, and the surface of the peripheral portion on which the light-blocking coating layer is disposed may be a smooth surface. Therefore, it is favorable for improving the fluidity of the light-blocking coating layer while coating it on the surface of the peripheral portion, so that the light-blocking position of the light-blocking coating layer and the roundness of the light-passing opening can be accurately controlled.

An average height of the nanostructure layer may be between 90 nm and 350 nm. Furthermore, the average height of the nanostructure layer may be between 125 nm and 300 nm. In addition, the average height of the nanostructure layer may be between 195 nm and 255 nm. Therefore, the height ranges of the nanostructure layer are set for disaffecting the image quality and simultaneously having better anti-reflection effects.

When the roundness tolerance of the light-passing opening is t, the following condition may be satisfied: $t<0.01$ mm. Therefore, it is favorable for replacing a light-blocking performance of a conventional light-blocking sheet with the light-blocking coating layer. Furthermore, the following condition may be satisfied: $t<0.005$ mm. Therefore, it is favorable for meeting the requirement of a more accurate light-blocking position.

The lens element may be a glass lens element. Therefore, it is advantageous in being less affected by changes in ambient temperature, thereby maintaining the stable optical quality.

The lens element may further include a connecting structure layer, which is disposed between the nanostructure layer and the optical effective portion, and between the nanostructure layer and the peripheral portion. Therefore, the connecting structure layer is advantageous in making the lens element and the nanostructure layer tightly bonded, thereby achieving higher structural stability.

The light-blocking coating layer may be further disposed on the outer diameter surface. Therefore, the light-blocking range of the light-blocking coating layer is extended so as to ensure the light-blocking effect for the non-imaging light on the outer diameter surface.

The light-blocking coating layer may be disposed on the object-side peripheral surface, the image-side peripheral surface and the outer diameter surface. Therefore, the light-blocking range of the light-blocking coating layer is extended so as to replace other adjacent optical element having the same function, thereby reducing the production costs.

The light-blocking coating layer may be extended from the outer diameter surface to the at least one axial connection structure. Therefore, the light-blocking requirements of the position of the axial connection structure are satisfied so as to improve the image quality.

According to another aspect of the present disclosure, an imaging lens assembly is provided. The imaging lens assembly includes a plurality of optical elements and a lens barrel. An optical axis passes through the optical elements, and at least one optical element of the optical elements is a lens element. The lens barrel accommodates the optical elements. The lens element includes an optical effective portion, a peripheral portion, a light-blocking coating layer and a nanostructure layer. The optical axis passes through the optical effective portion, which includes an object-side optical effective surface and an image-side optical effective surface. The object-side optical effective surface faces an object side of the imaging lens assembly. The image-side optical effective surface faces an image side of the imaging lens assembly and is disposed oppositely to the object-side optical effective surface. The peripheral portion surrounds the optical effective portion and includes an object-side peripheral surface, an image-side peripheral surface and an outer diameter surface. The object-side peripheral surface faces the object side of the imaging lens assembly. The image-side peripheral surface faces the image side of the imaging lens assembly and is disposed oppositely to the object-side peripheral surface. The outer diameter surface is connected to the object-side peripheral surface and the image-side peripheral surface. The light-blocking coating layer is disposed on at least one surface of the object-side peripheral surface and the image-side peripheral surface and includes a tapered portion. The tapered portion is tapered toward a center of the optical effective portion, and the tapered portion is tapered adjacent to a boundary between the optical effective portion and the peripheral portion. The nanostructure layer is disposed on the optical effective portion and the tapered portion of the light-blocking coating layer, and the nanostructure layer has a plurality of irregular ridge-shaped protrusions. The tapered portion of the light-blocking coating layer forms a light-passing opening adjacent to the boundary along a direction surrounding the optical axis.

In detail, each of the object-side optical effective surface and the image-side optical effective surface of the optical effective portion may be a smooth surface, and the surface of the peripheral portion on which the light-blocking coating layer is disposed may be a smooth surface. Therefore, it is favorable for improving the fluidity of the light-blocking coating layer while coating it on the surface of the peripheral portion, so that the light-blocking position of the light-blocking coating layer and the roundness of the light-passing opening can be accurately controlled.

An average height of the nanostructure layer may be between 90 nm and 350 nm. Furthermore, the average height of the nanostructure layer may be between 125 nm and 300 nm. In addition, the average height of the nanostructure layer may be between 195 nm and 255 nm. Therefore, the height ranges of the nanostructure layer are set for disaffecting the image quality and simultaneously having better anti-reflection effects.

When the roundness tolerance of the light-passing opening is t, the following condition may be satisfied: $t<0.02$ mm. Therefore, it is favorable for replacing a light-blocking performance of a conventional light-blocking sheet with the light-blocking coating layer. Furthermore, the following condition may be satisfied: $t<0.01$ mm. Therefore, it is favorable for replacing the light-blocking performance of the conventional light-blocking sheet with the light-blocking coating layer. In addition, the following condition may be satisfied: $t<0.005$ mm. Therefore, it is favorable for meeting the requirement of a more accurate light-blocking position.

The lens element may further include a connecting structure layer, which is disposed between the nanostructure layer and the optical effective portion, and between the nanostructure layer and the peripheral portion. Therefore, the connecting structure layer is advantageous in making the lens element and the nanostructure layer tightly bonded, thereby achieving higher structural stability.

A material of the nanostructure layer may include a metal oxide. Therefore, the selected material property is favorable for better anti-reflection effect.

A material of the connecting structure layer may include a non-metal oxide. Therefore, the selected material property is favorable for better structural stability.

Each of the aforementioned features can be utilized in various combinations for achieving the corresponding effects. According to the aforementioned aspects, specific embodiments are provided, and illustrated via figures.

1st Embodiment

FIG. 1A is a schematic view (cross-sectional view) of a camera module 100 according to the 1st embodiment of the present disclosure. With reference to FIG. 1A, the camera module 100 includes an imaging lens assembly 110, a filter 148 and an image sensor 160. The filter 148 is disposed between the imaging lens assembly 110 and an imaging surface 150 of the camera module 100 (i.e., the imaging surface 150 of the imaging lens assembly 110), and the image sensor 160 is disposed on the imaging surface 150 of the camera module 100. The imaging lens assembly 110 includes a plurality of optical elements (e.g., a first lens element 200, a second lens element 300, a third lens element 400, light-blocking sheets 137, 138, a spacer, a retainer, etc.) and a lens barrel 120, and structures of some of the optical elements are not completely shown in FIG. 1A. The lens barrel 120 accommodates the optical elements, an optical axis z passes through the optical elements, and three optical elements of the optical elements are the first lens element 200, the second lens element 300 and the third lens element 400.

Figure 1B:
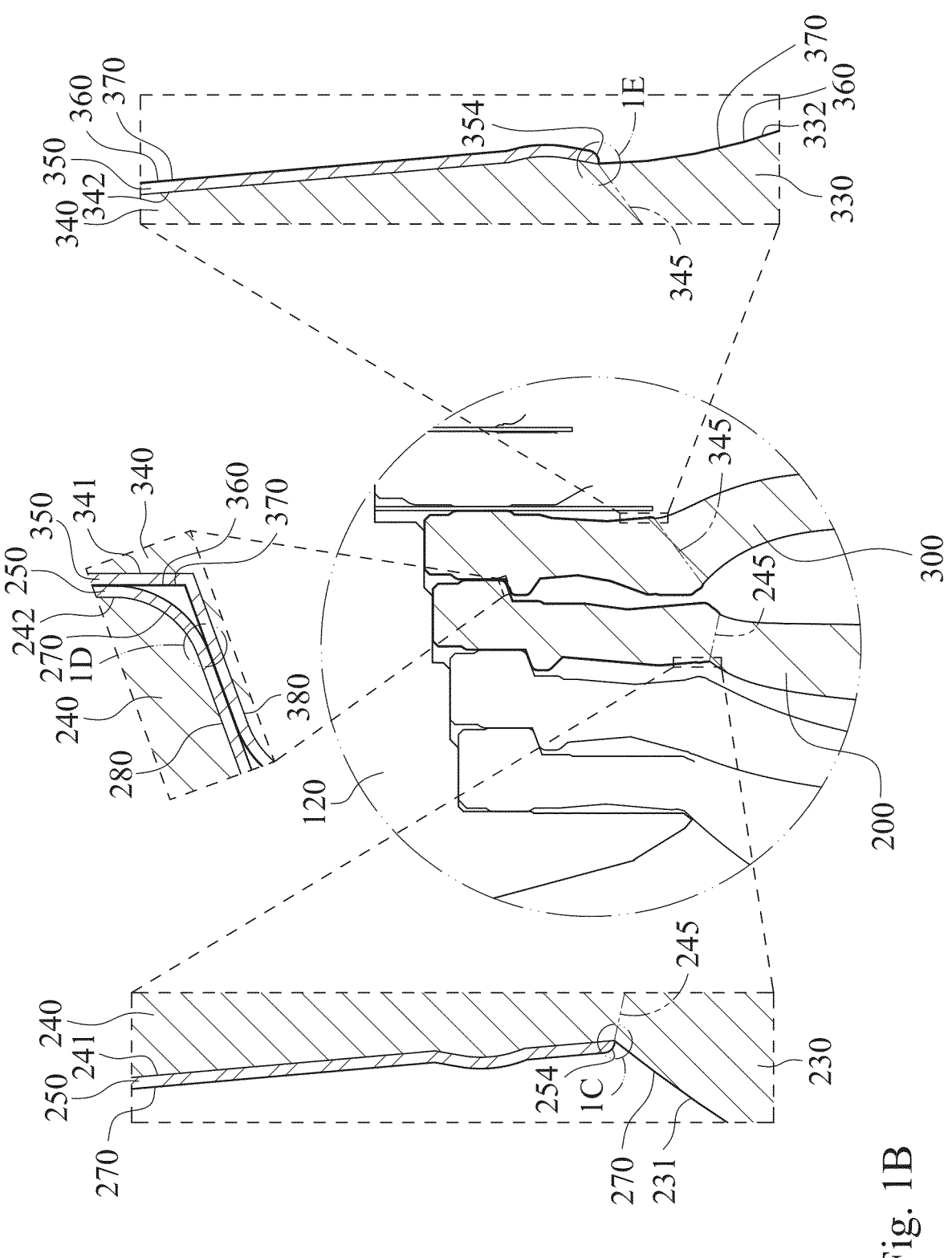
FIG. 1B is an enlarged view of part 1B of the camera module in FIG. 1A.
Figure 1C:
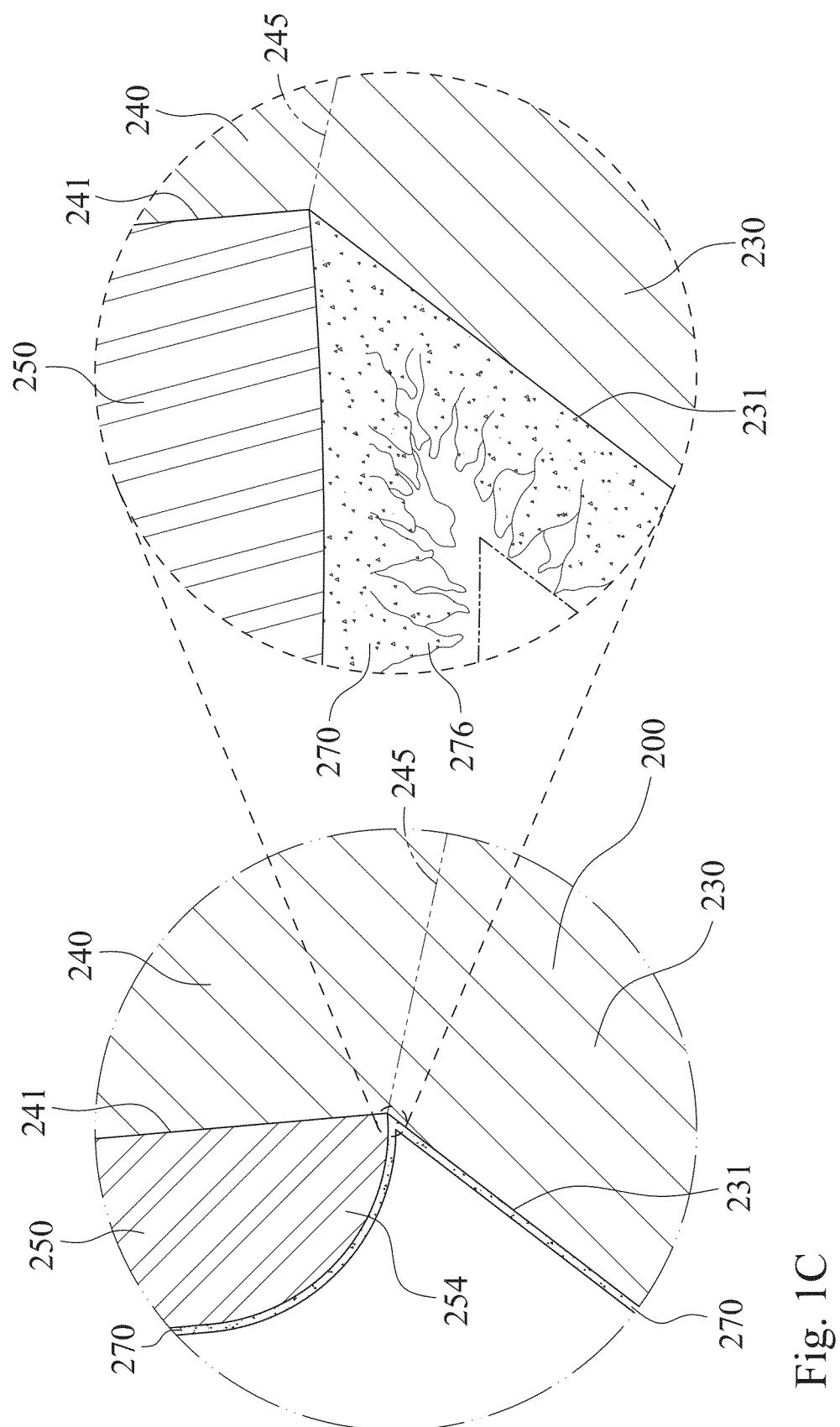
FIG. 1C is an enlarged view of part 1C of the camera module in FIG. 1B.
Figure 1D:
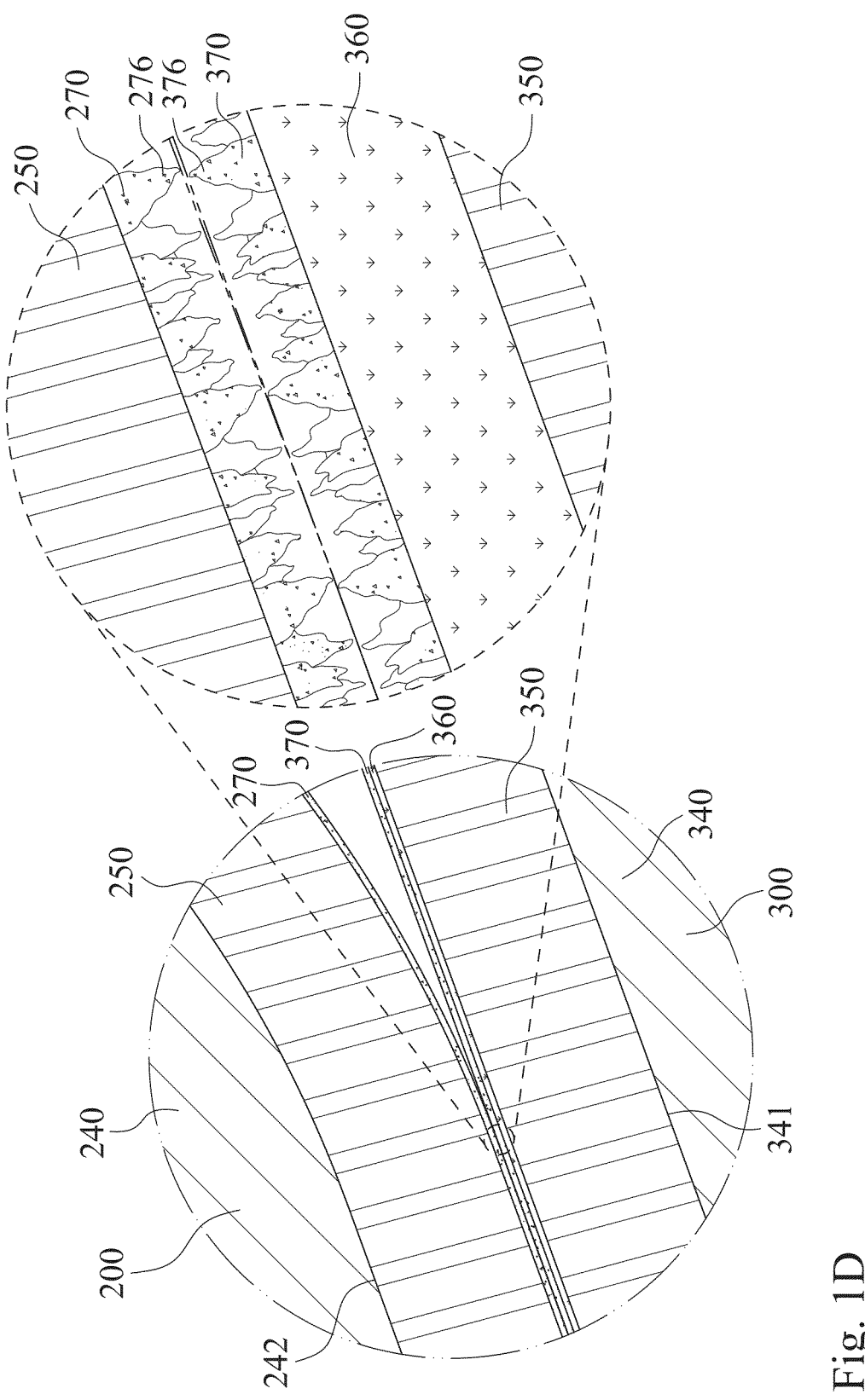
FIG. 1D is an enlarged view of part 1D of the camera module in FIG. 1B.
Figure 1E:
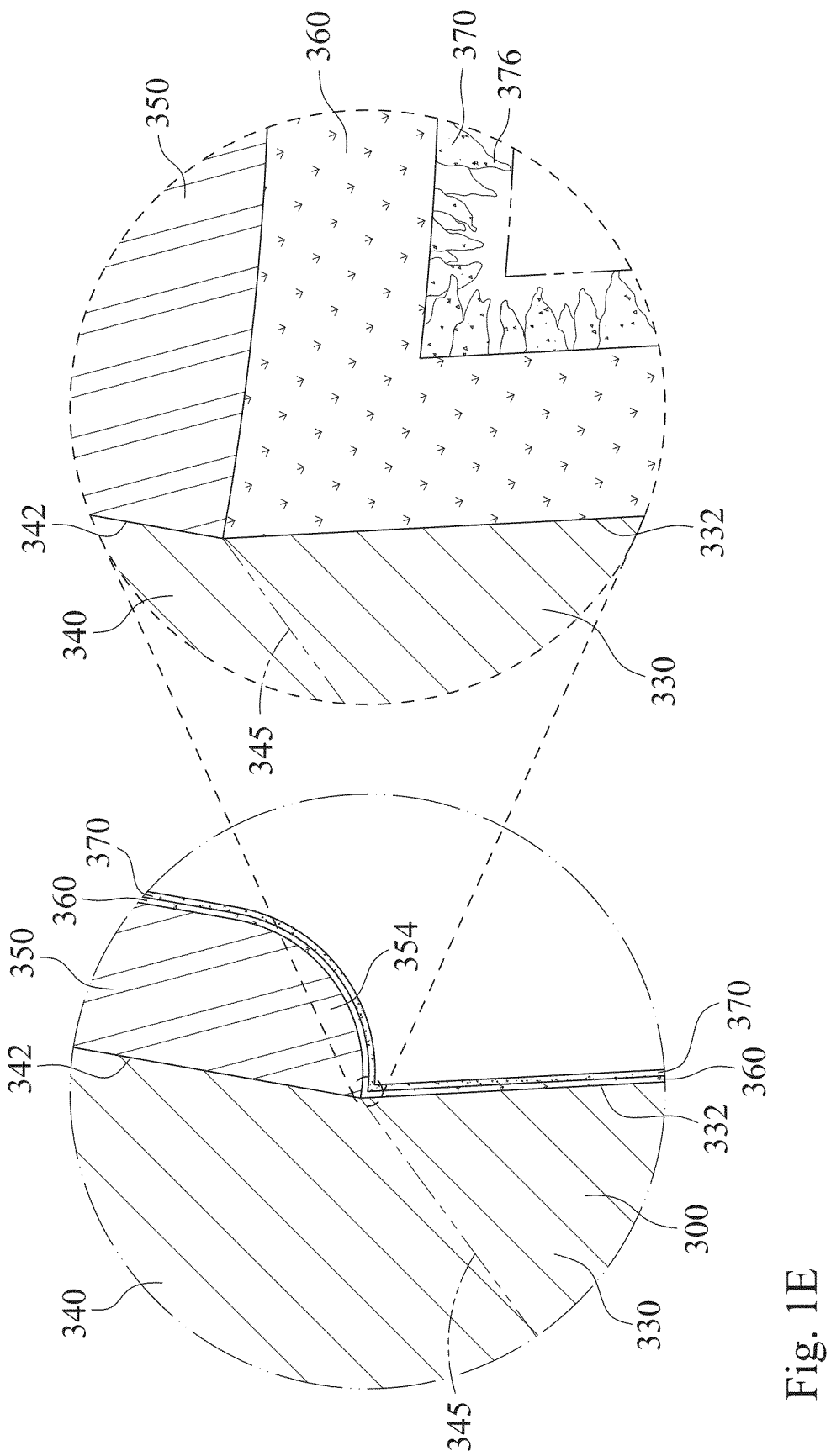
FIG. 1E is an enlarged view of part 1E of the camera module in FIG. 1B.
Figure 1F:
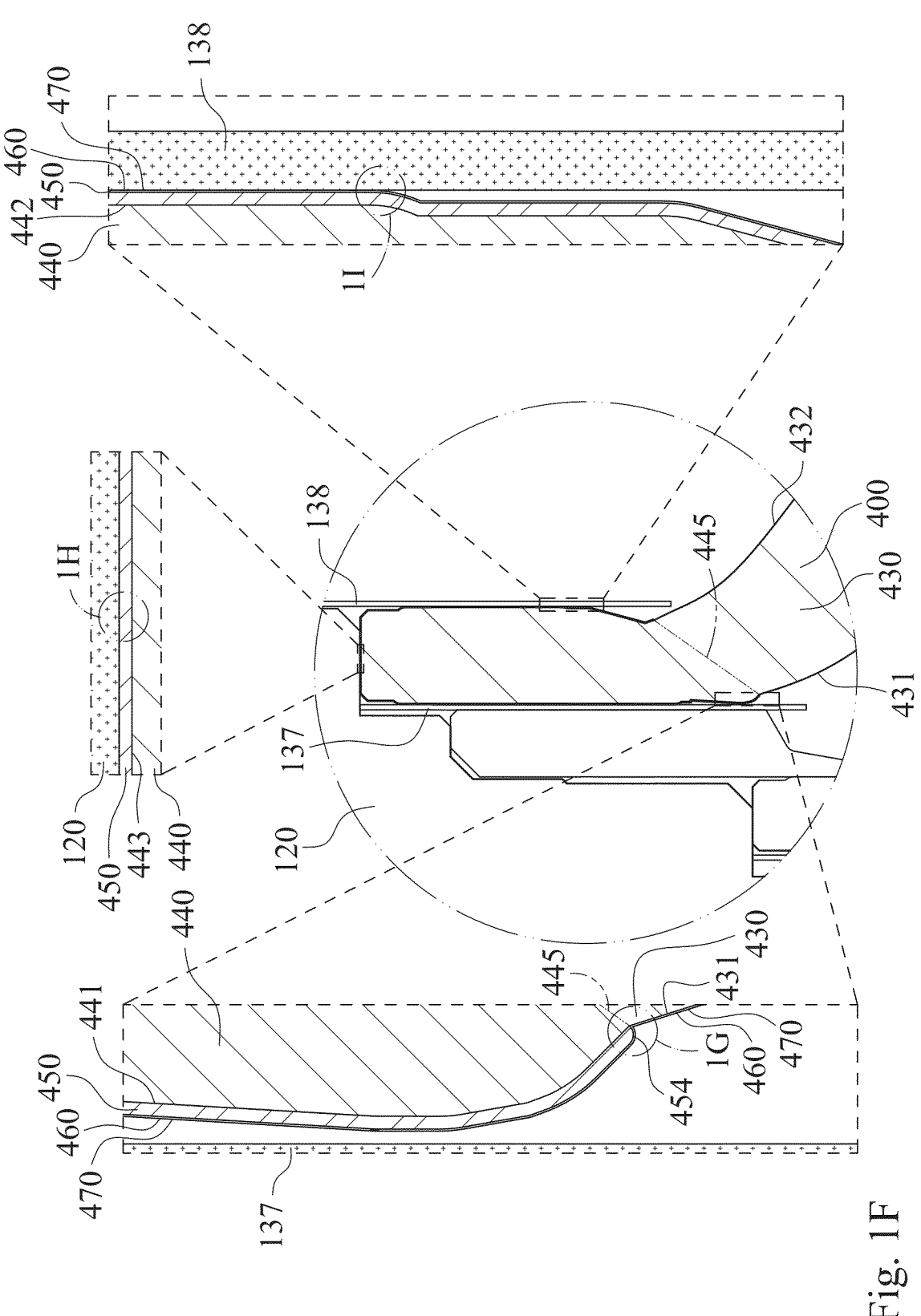
FIG. 1F is an enlarged view of part 1F of the camera module in FIG. 1A.
Figure 1G:
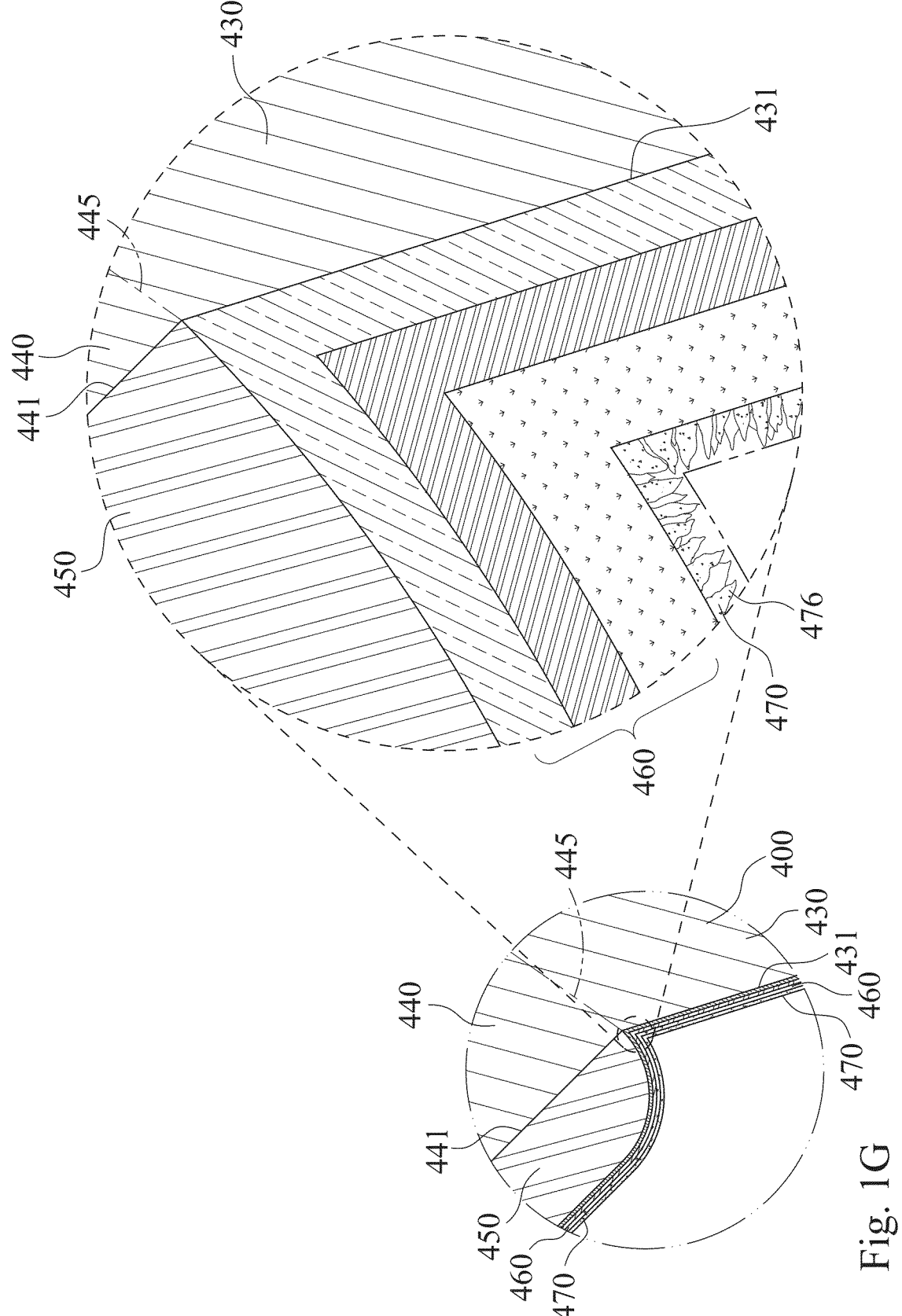
FIG. 1G is an enlarged view of part 1G of the camera module in FIG. 1F.
Figure 1H:
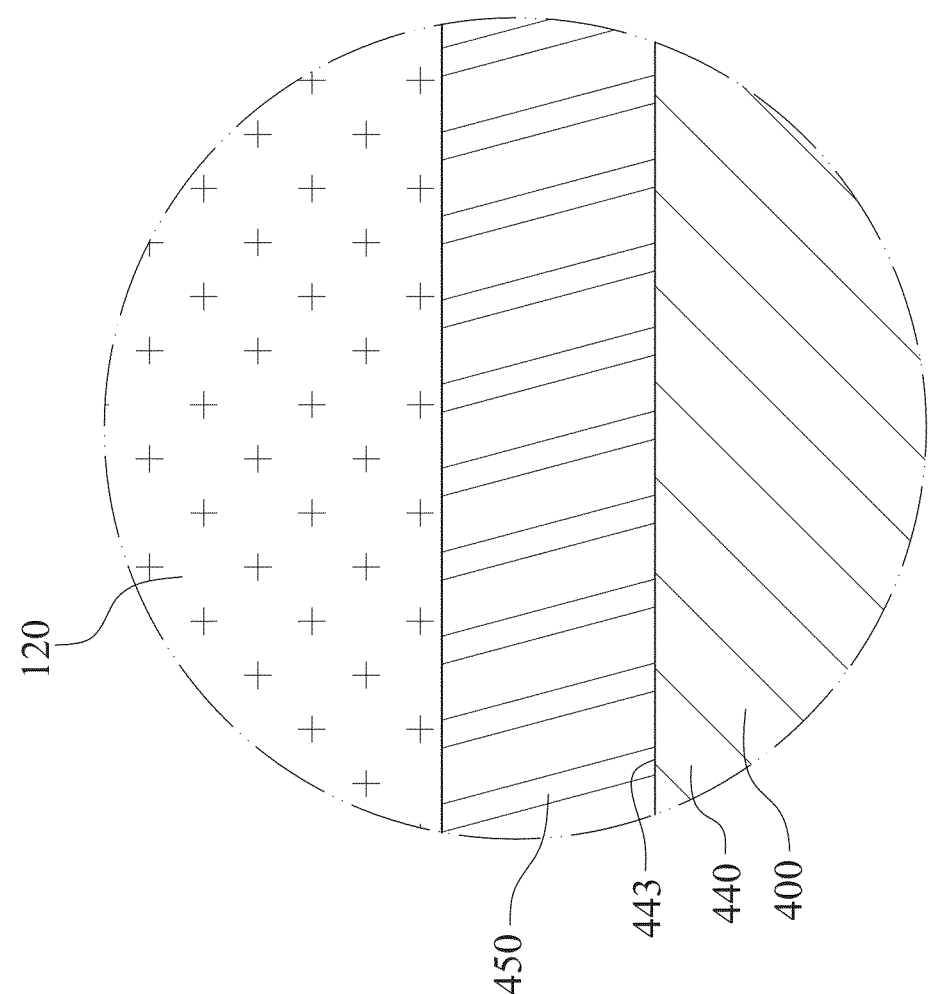
FIG. 1H is an enlarged view of part 1H of the camera module in FIG. 1F.
Figure 1I:
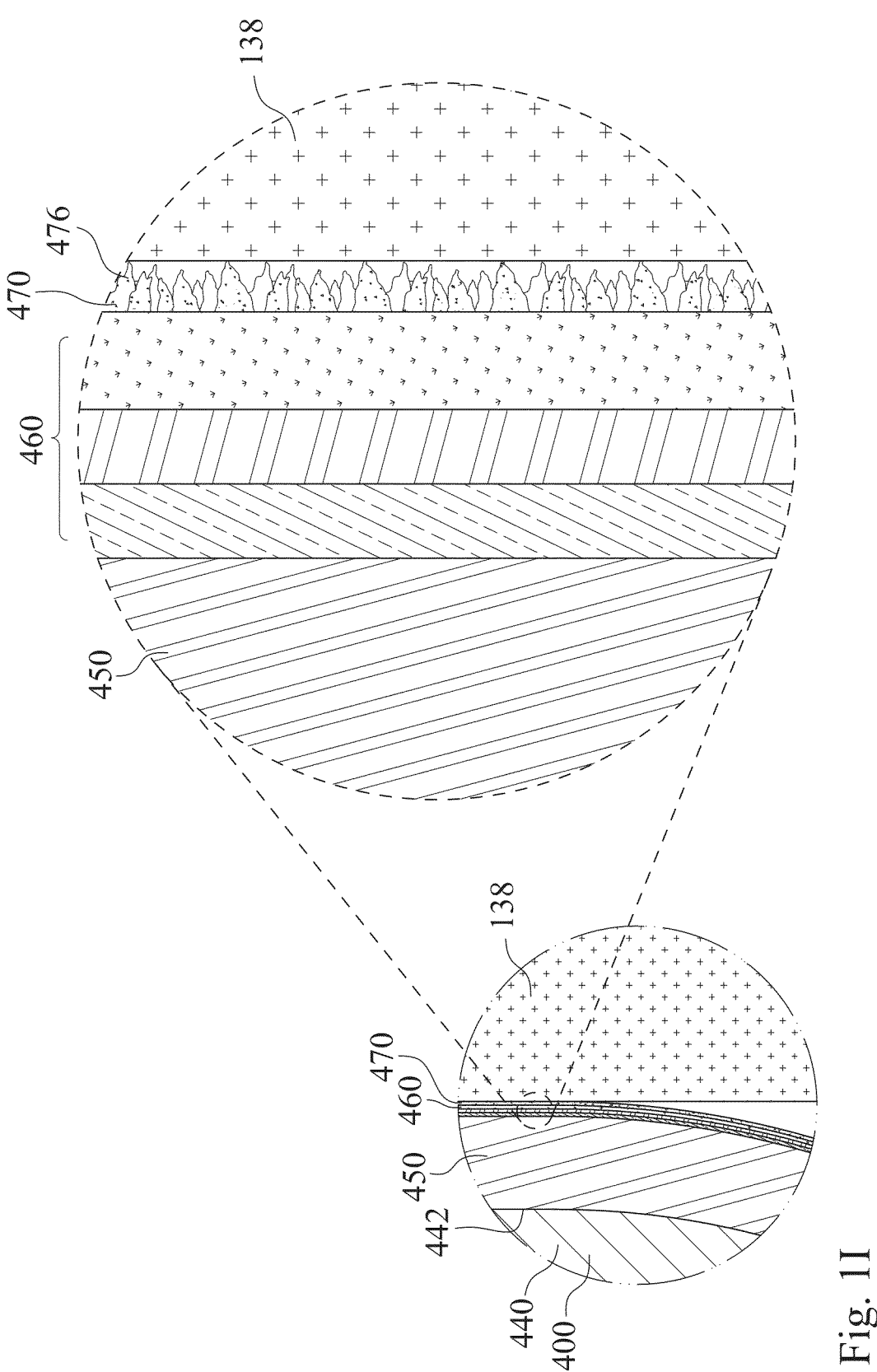
FIG. 1I is an enlarged view of part 1I of the camera module in FIG. 1F.
Figure 1J:
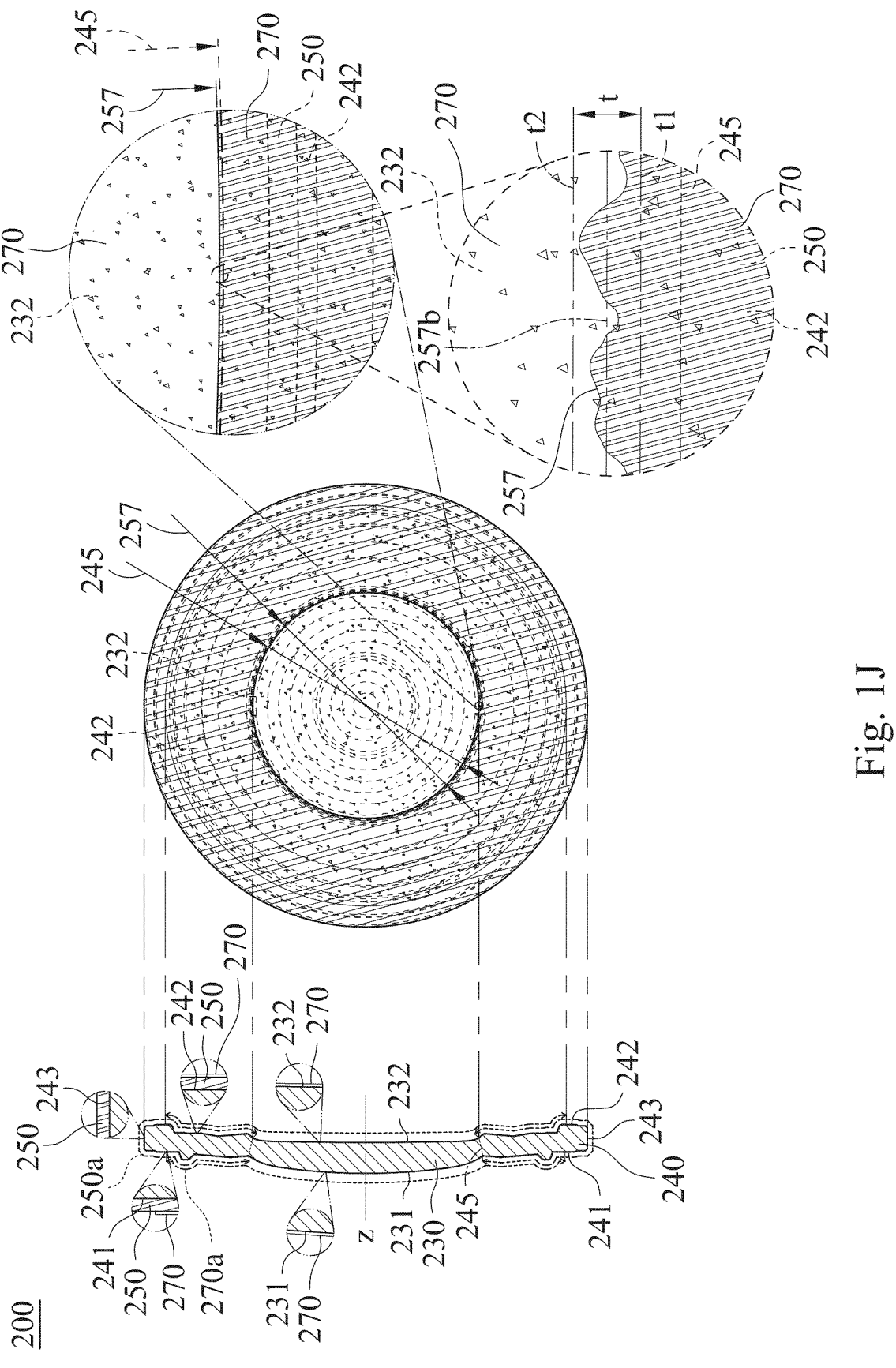
FIG. 1J is a schematic view of a first lens element of the camera module in FIG. 1A.
Figure 1K:
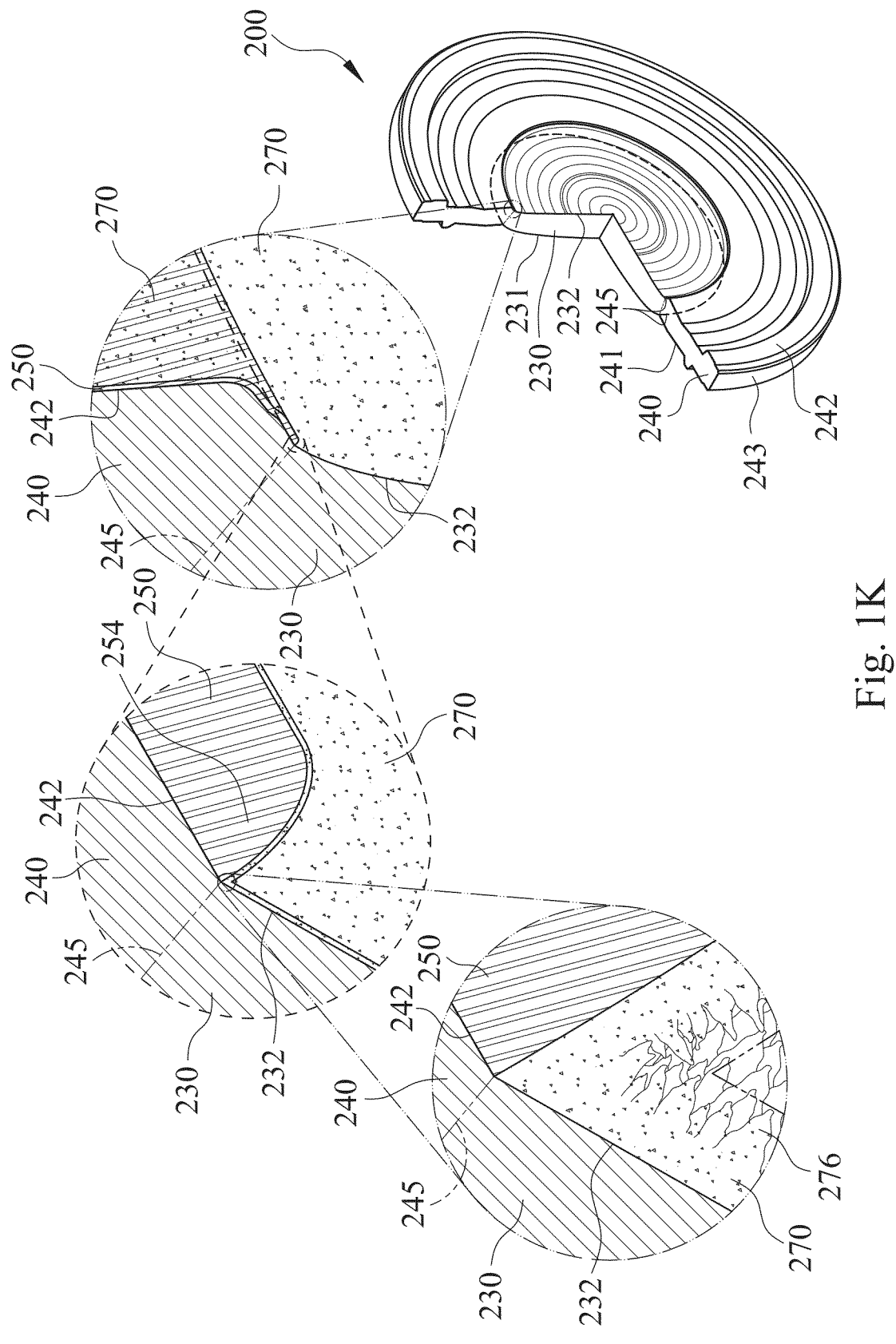
FIG. 1K is a three-dimensional exploded view of the first lens element of the camera module in FIG. 1A.

FIG. 1B is an enlarged view of part 1B of the camera module 100 in FIG. 1A, FIG. 1C is an enlarged view of part 1C of the camera module 100 in FIG. 1B, FIG. 1D is an enlarged view of part 1D of the camera module 100 in FIG. 1B, FIG. 1E is an enlarged view of part 1E of the camera module 100 in FIG. 1B, FIG. 1F is an enlarged view of part 1F of the camera module 100 in FIG. 1A, FIG. 1G is an enlarged view of part 1G of the camera module 100 in FIG. 1F, FIG. 1H is an enlarged view of part 1H of the camera module 100 in FIG. 1F, FIG. 1I is an enlarged view of part 1I of the camera module 100 in FIG. 1F, FIG. 1J is a schematic view (a relationship drawing between the cross-sectional view and the image-side view) of the first lens element 200 of the camera module 100 in FIG. 1A, and FIG. 1K is a three-dimensional exploded view of the first lens element 200 of the camera module 100 in FIG. 1A. With reference to FIG. 1A to FIG. 1K, the first lens element 200 of the imaging lens assembly 110 of the camera module 100 includes an optical effective portion 230, a peripheral portion 240, a light-blocking coating layer 250 and a nanostructure layer 270.

With reference to FIG. 1A, the optical axis z passes through the optical effective portion 230 of the first lens element 200. The optical effective portion 230 includes an object-side optical effective surface 231 and an image-side optical effective surface 232. The object-side optical effective surface 231 faces an object side of the imaging lens assembly 110 (i.e., the left side in FIG. 1A). The image-side optical effective surface 232 faces an image side of the imaging lens assembly 110 (i.e., the right side in FIG. 1A) and is disposed oppositely to the object-side optical effective surface 231. The peripheral portion 240 of the first lens element 200 surrounds the optical effective portion 230 and includes an object-side peripheral surface 241, an image-side peripheral surface 242 and an outer diameter surface 243. The object-side peripheral surface 241 faces the object side of the imaging lens assembly 110. The image-side peripheral surface 242 faces the image side of the imaging lens assembly 110 and is disposed oppositely to the object-side peripheral surface 241. The outer diameter surface 243 is connected to the object-side peripheral surface 241 and the image-side peripheral surface 242.

With reference to FIG. 1B, FIG. 1D, FIG. 1J and FIG. 1K, the light-blocking coating layer 250 of the first lens element 200 is disposed on at least one surface of the object-side peripheral surface 241 and the image-side peripheral surface 242 and includes a tapered portion 254. The tapered portion 254 is tapered toward a center of the optical effective portion 230, and the tapered portion 254 is tapered adjacent to a boundary 245 between the optical effective portion 230 and the peripheral portion 240. Specifically, the light-blocking coating layer 250 is disposed on the object-side peripheral surface 241 and the image-side peripheral surface 242. The two tapered portions 254 are respectively disposed on the object-side peripheral surface 241 and the image-side peripheral surface 242 and tapered toward the center of the optical effective portion 230. The tapered portion 254 disposed on the object-side peripheral surface 241 is tapered adjacent to the boundary 245 between the object-side optical effective surface 231 and the object-side peripheral surface 241. The tapered portion 254 disposed on the image-side peripheral surface 242 is tapered adjacent to the boundary 245 between the image-side optical effective surface 232 and the image-side peripheral surface 242.

The nanostructure layer 270 of the first lens element 200 is disposed on the optical effective portion 230 and one of the tapered portions 254 of the light-blocking coating layer 250, and the nanostructure layer 270 has a plurality of irregular ridge-shaped protrusions 276. Each of the tapered portions 254 of the light-blocking coating layer 250 forms a light-passing opening 257 adjacent to the corresponding boundary 245 along a direction surrounding the optical axis z. Specifically, there are two nanostructure layers 270. One of the two nanostructure layers 270 is disposed on the object-side optical effective surface 231 and the tapered portion 254 of the light-blocking coating layer 250 of the object-side peripheral surface 241, and the tapered portion 254 forms a light-passing opening 257 adjacent to the corresponding boundary 245 along the direction surrounding the optical axis z. The other of the two nanostructure layers 270 is disposed on the image-side optical effective surface 232 and the tapered portion 254 of the light-blocking coating layer 250 of the image-side peripheral surface 242, the tapered portion 254 forms another light-passing opening 257 adjacent to the corresponding boundary 245 along the direction surrounding the optical axis z, as shown in the upper right enlarged view and the lower right enlarged view in FIG. 1J, and the light-passing opening 257 shown in FIG. 1J is slightly closer to the optical axis z than the corresponding boundary 245 thereto.

In detail, with reference to FIG. 1J, when a roundness tolerance of each of the light-passing openings 257 is t, the following condition may be satisfied: t<0.02 mm. In addition, the following condition may be satisfied: t<0.01 mm. Furthermore, the following condition may be satisfied: t<0.005 mm. As shown in the lower right enlarged view in FIG. 1J, the light-passing opening 257 is an actual shape of the light-passing opening 257 and different from an ideal light-passing opening shape 257b of a regular circle shape, and the roundness tolerance t of the light-passing opening 257 is defined according to the difference between the upper roundness limit t1 and the lower roundness limit t2.

The first lens element 200 may be a glass lens element. Each of the object-side optical effective surface 231 and the image-side optical effective surface 232 of the optical effective portion 230 may be a smooth surface. Each of the object-side peripheral surface 241 and the image-side peripheral surface 242 on which the light-blocking coating layer 250 is disposed may be a smooth surface.

With reference to FIG. 1J, a light-blocking coating layer range 250a in the leftmost drawing in FIG. 1J represents the range of the light-blocking coating layer 250 and does not represent the height of the light-blocking coating layer 250. The light-blocking coating layer 250 is further disposed on the outer diameter surface 243. That is, the light-blocking coating layer 250 is disposed on the object-side peripheral surface 241, the image-side peripheral surface 242 and the outer diameter surface 243. Specifically, the light-blocking coating layer 250 is substantially coated on the entire surface of the peripheral portion 240.

With reference to FIG. 1B and FIG. 1J, the first lens element 200 further includes an axial connection structure 280, which is disposed on the image-side peripheral surface 242. The axial connection structure 280 is configured for connecting to the second lens element 300, which is adjacent to the first lens element 200. Specifically, the axial connection structure 280 is indirectly connected to the second lens element 300 adjacent thereto. The axial connection structure 280 aligns the optical axis z with the second lens element 300 adjacent thereto, and the first lens element 200 and the second lens element 300 adjacent thereto are fitted and assembled with each other. Furthermore, the light-blocking coating layer 250 of the first lens element 200 is extended from the outer diameter surface 243 to the axial connection structure 280.

With reference to FIG. 1C, FIG. 1D, FIG. 1J and FIG. 1K, a nanostructure layer range 270a in the leftmost drawing in FIG. 1J represents the range of the nanostructure layer 270 and does not represent the height of the nanostructure layer 270. An average height of each of the nanostructure layers 270 may be between 90 nm and 350 nm. Furthermore, the average height of each of the nanostructure layers 270 may be between 125 nm and 300 nm. In addition, the average height of each of the nanostructure layers 270 may be between 195 nm and 255 nm. Moreover, a material of each of the nanostructure layers 270 may include a metal oxide.

Figure 1L:
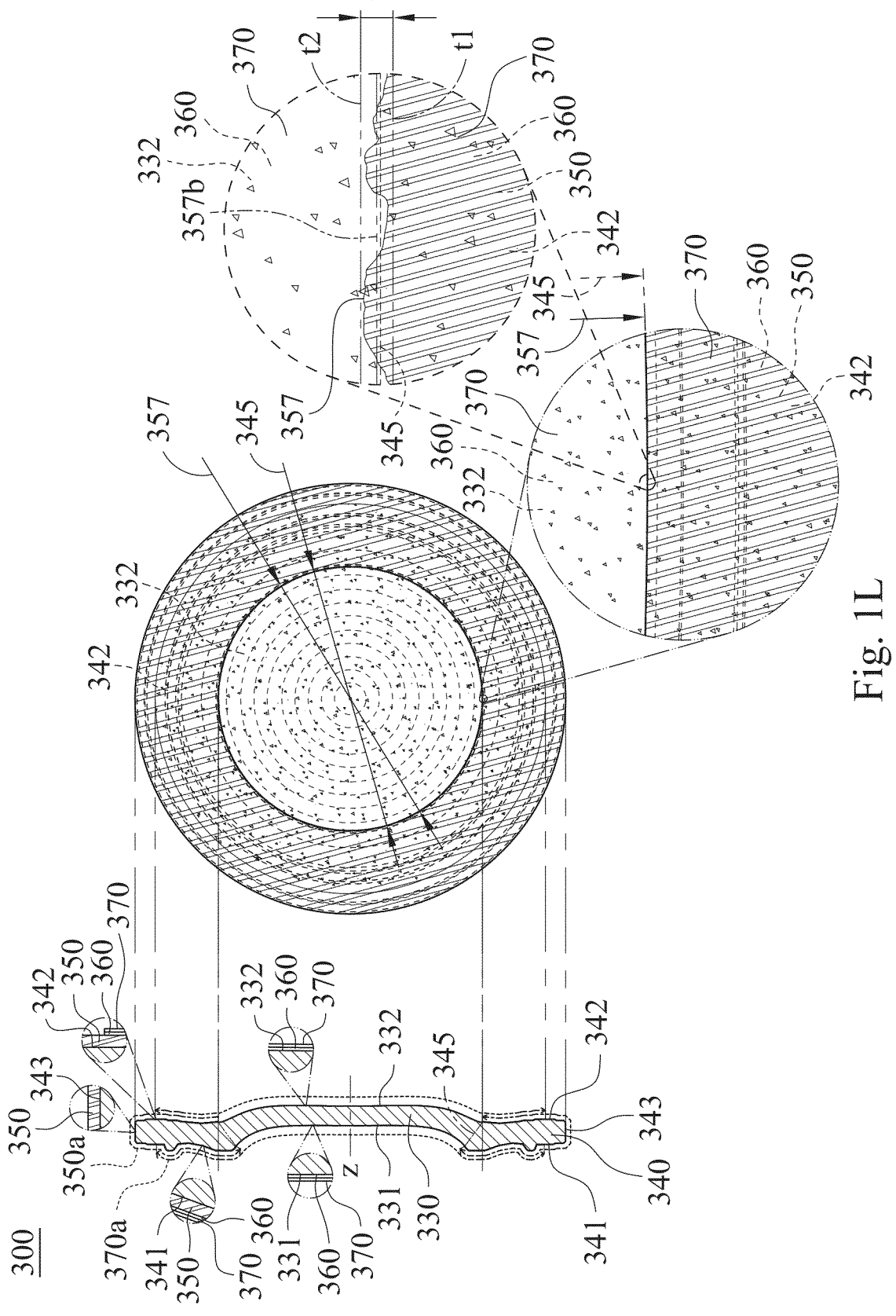
FIG. 1L is a schematic view of a second lens element of the camera module in FIG. 1A.
Figure 1M:
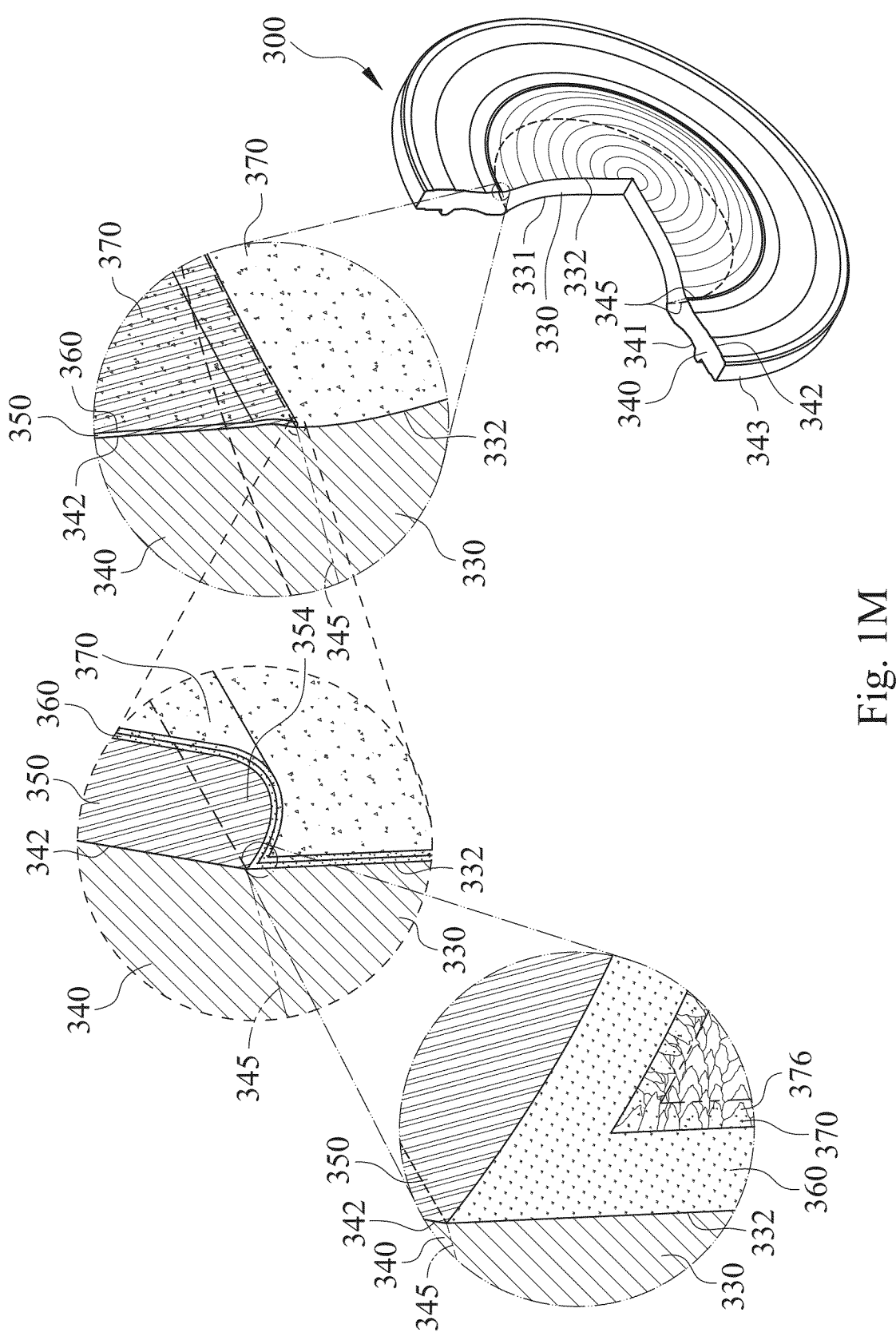
FIG. 1M is a three-dimensional exploded view of the second lens element of the camera module in FIG. 1A.

FIG. 1L is a schematic view (a relationship drawing between the cross-sectional view and the image-side view) of the second lens element 300 of the camera module 100 in FIG. 1A, and FIG. 1M is a three-dimensional exploded view of the second lens element 300 of the camera module 100 in FIG. 1A. With reference to FIG. 1B, FIG. 1D, FIG. 1E, FIG. 1L and FIG. 1M, the second lens element 300 of the imaging lens assembly 110 of the camera module 100 includes an optical effective portion 330, a peripheral portion 340, a light-blocking coating layer 350 and a nanostructure layer 370.

With reference to FIG. 1A, the optical axis z passes through the optical effective portion 330 of the second lens element 300. The optical effective portion 330 includes an object-side optical effective surface 331 and an image-side optical effective surface 332. The object-side optical effective surface 331 faces the object side of the imaging lens assembly 110. The image-side optical effective surface 332 faces the image side of the imaging lens assembly 110 and is disposed oppositely to the object-side optical effective surface 331. The peripheral portion 340 of the second lens element 300 surrounds the optical effective portion 330 and includes an object-side peripheral surface 341, an image-side peripheral surface 342 and an outer diameter surface 343. The object-side peripheral surface 341 faces the object side of the imaging lens assembly 110. The image-side peripheral surface 342 faces the image side of the imaging lens assembly 110 and is disposed oppositely to the object-side peripheral surface 341. The outer diameter surface 343 is connected to the object-side peripheral surface 341 and the image-side peripheral surface 342.

With reference to FIG. 1B, FIG. 1D, FIG. 1E, FIG. 1L and FIG. 1M, the light-blocking coating layer 350 of the second lens element 300 is disposed on at least one surface of the object-side peripheral surface 341 and the image-side peripheral surface 342 and includes a tapered portion 354. The tapered portion 354 is tapered toward a center of the optical effective portion 330, and the tapered portion 354 is tapered adjacent to a boundary 345 between the optical effective portion 330 and the peripheral portion 340. Specifically, the light-blocking coating layer 350 is disposed on the object-side peripheral surface 341 and the image-side peripheral surface 342. The two tapered portions 354 are respectively disposed on the object-side peripheral surface 341 and the image-side peripheral surface 342 and tapered toward the center of the optical effective portion 330. The tapered portion 354 disposed on the object-side peripheral surface 341 is tapered adjacent to the boundary 345 between the object-side optical effective surface 331 and the object-side peripheral surface 341. The tapered portion 354 disposed on the image-side peripheral surface 342 is tapered adjacent to the boundary 345 between the image-side optical effective surface 332 and the image-side peripheral surface 342.

The nanostructure layer 370 of the second lens element 300 is disposed on the optical effective portion 330 and one of the tapered portions 354 of the light-blocking coating layer 350, and the nanostructure layer 370 has a plurality of irregular ridge-shaped protrusions 376. Each of the tapered portions 354 of the light-blocking coating layer 350 forms a light-passing opening 357 adjacent to the corresponding boundary 345 along a direction surrounding the optical axis z. Specifically, there are two nanostructure layers 370. One of the two nanostructure layers 370 is disposed on the object-side optical effective surface 331 and the tapered portion 354 of the light-blocking coating layer 350 of the object-side peripheral surface 341, and the tapered portion 354 forms a light-passing opening 357 adjacent to the corresponding boundary 345 along the direction surrounding the optical axis z. The other of the two nanostructure layers 370 is disposed on the image-side optical effective surface 332 and the tapered portion 354 of the light-blocking coating layer 350 of the image-side peripheral surface 342, the tapered portion 354 forms another light-passing opening 357 adjacent to the corresponding boundary 345 along the direction surrounding the optical axis z, as shown in the upper right enlarged view in FIG. 1L, and the position of the light-passing opening 357 shown in FIG. 1L is very close to the position of the corresponding boundary 345.

In detail, with reference to FIG. 1L, when a roundness tolerance of each of the light-passing openings 357 is t, the following condition may be satisfied: t<0.02 mm. In addition, the following condition may be satisfied: t<0.01 mm. Furthermore, the following condition may be satisfied: t<0.005 mm. As shown in the upper right enlarged view in FIG. 1L, the light-passing opening 357 is an actual shape of the light-passing opening 357 and different from an ideal light-passing opening shape 357b of a regular circle shape, and the roundness tolerance t of the light-passing opening 357 is defined according to the difference between the upper roundness limit t1 and the lower roundness limit t2.

The second lens element 300 may be a glass lens element. Each of the object-side optical effective surface 331 and the image-side optical effective surface 332 of the optical effective portion 330 may be a smooth surface. Each of the object-side peripheral surface 341 and the image-side peripheral surface 342 on which the light-blocking coating layer 350 is disposed may be a smooth surface.

With reference to FIG. 1L, a light-blocking coating layer range 350a in the leftmost drawing in FIG. 1L represents the range of the light-blocking coating layer 350 and does not represent the height of the light-blocking coating layer 350. The light-blocking coating layer 350 is further disposed on the outer diameter surface 343. That is, the light-blocking coating layer 350 is disposed on the object-side peripheral surface 341, the image-side peripheral surface 342 and the outer diameter surface 343. Specifically, the light-blocking coating layer 350 is substantially coated on the entire surface of the peripheral portion 340.

With reference to FIG. 1B and FIG. 1L, the second lens element 300 further includes an axial connection structure 380, which is disposed on the object-side peripheral surface 341. The axial connection structure 380 is configured for connecting to the axial connection structure 280 of the first lens element 200, which is adjacent to the second lens element 300. Specifically, the axial connection structure 380 is indirectly connected to the axial connection structure 280 adjacent thereto via the light-blocking coating layer 350, a connecting structure layer 360, the nanostructure layers 370, 270 and the light-blocking coating layer 250. The axial connection structure 380 aligns the optical axis z with the axial connection structure 280 of the first lens element 200 adjacent thereto, and the second lens element 300 and the first lens element 200 adjacent thereto are fitted and assembled with each other. Furthermore, the light-blocking coating layer 350 of the second lens element 300 is extended from the outer diameter surface 343 to the axial connection structure 380.

With reference to FIG. 1D, FIG. 1E and FIG. 1M, the second lens element 300 further includes the connecting structure layer 360, which is disposed between one of the nanostructure layers 370 and the optical effective portion 330, and between the one of the nanostructure layers 370 and the peripheral portion 340. Specifically, there are two connecting structure layers 360 on the second lens element 300. One of the two connecting structure layers 360 is disposed between the corresponding nanostructure layer 370 and the object-side optical effective surface 331, and between the corresponding nanostructure layer 370 and the object-side peripheral surface 341. The other of the two connecting structure layers 360 is disposed between the corresponding nanostructure layer 370 and the image-side optical effective surface 332, and between the corresponding nanostructure layer 370 and the image-side peripheral surface 342. In addition, it can be said that each of the nanostructure layers 370 is disposed on the topmost layer of the corresponding connecting structure layer 360. Moreover, a material of each of the connecting structure layers 360 may include a non-metal oxide, e.g., each of the connecting structure layers 360 may include a silicon dioxide coating layer.

A nanostructure layer range 370a in the leftmost drawing in FIG. 1L represents the range of the nanostructure layer 370 and does not represent the height of the nanostructure layer 370. An average height of each of the nanostructure layers 370 may be between 90 nm and 350 nm. Furthermore, the average height of each of the nanostructure layers 370 may be between 125 nm and 300 nm. In addition, the average height of each of the nanostructure layers 370 may be between 195 nm and 255 nm. Moreover, a material of each of the nanostructure layers 370 may include a metal oxide.

Figure 1N:
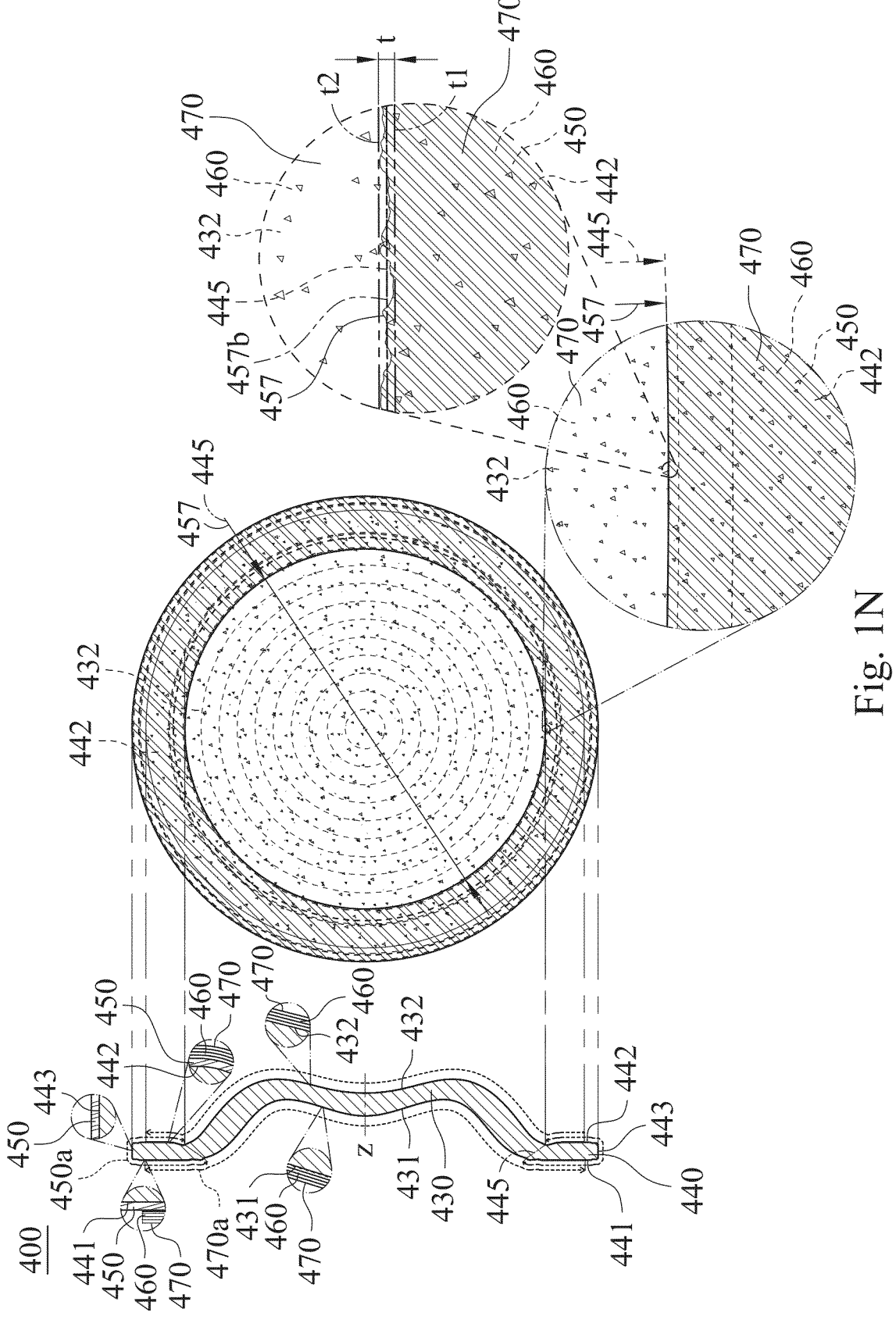
FIG. 1N is a schematic view of a third lens element of the camera module in FIG. 1A.
Figure 1O:
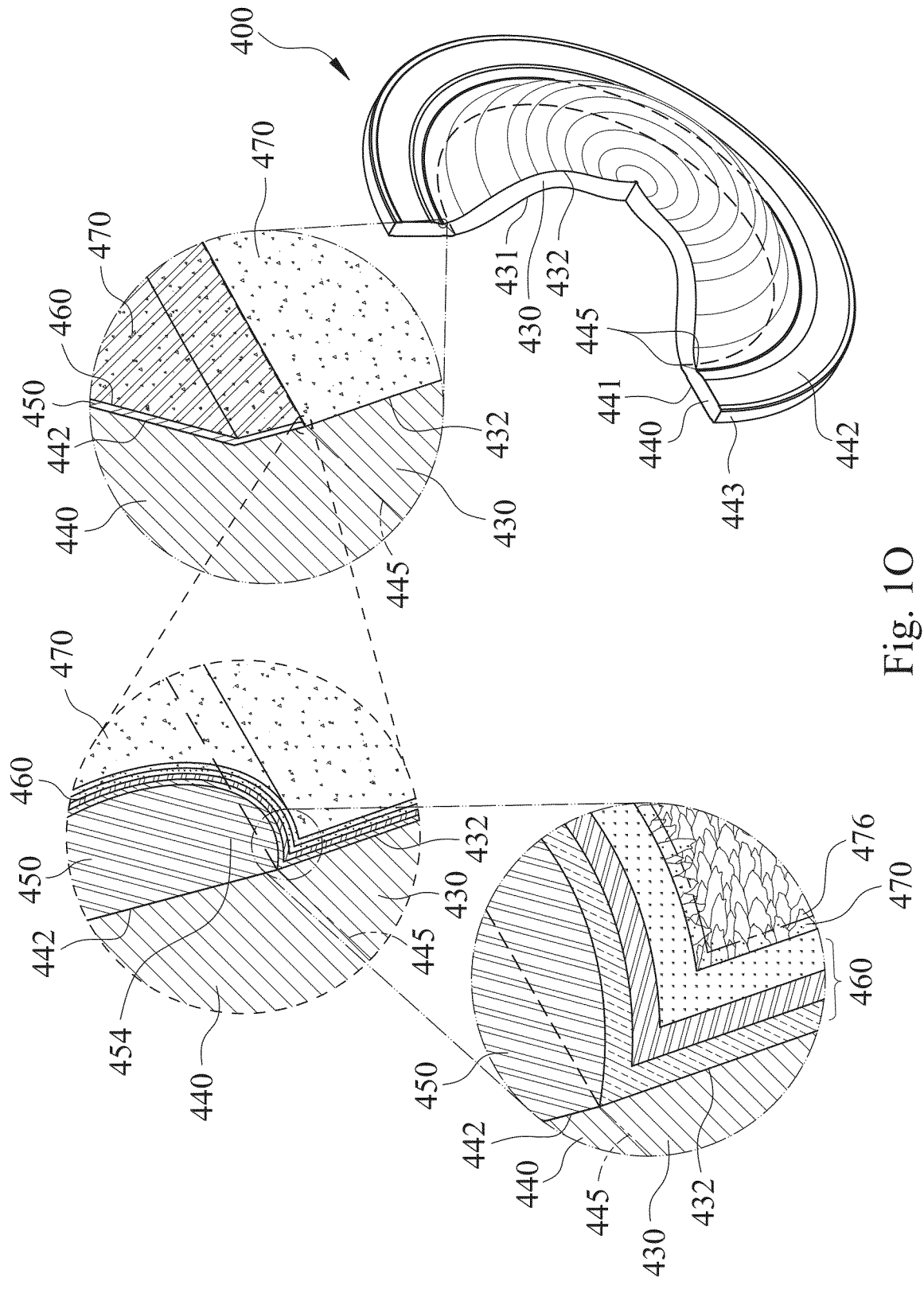
FIG. 1O is a three-dimensional exploded view of the third lens element of the camera module in FIG. 1A.
Figure 1P:
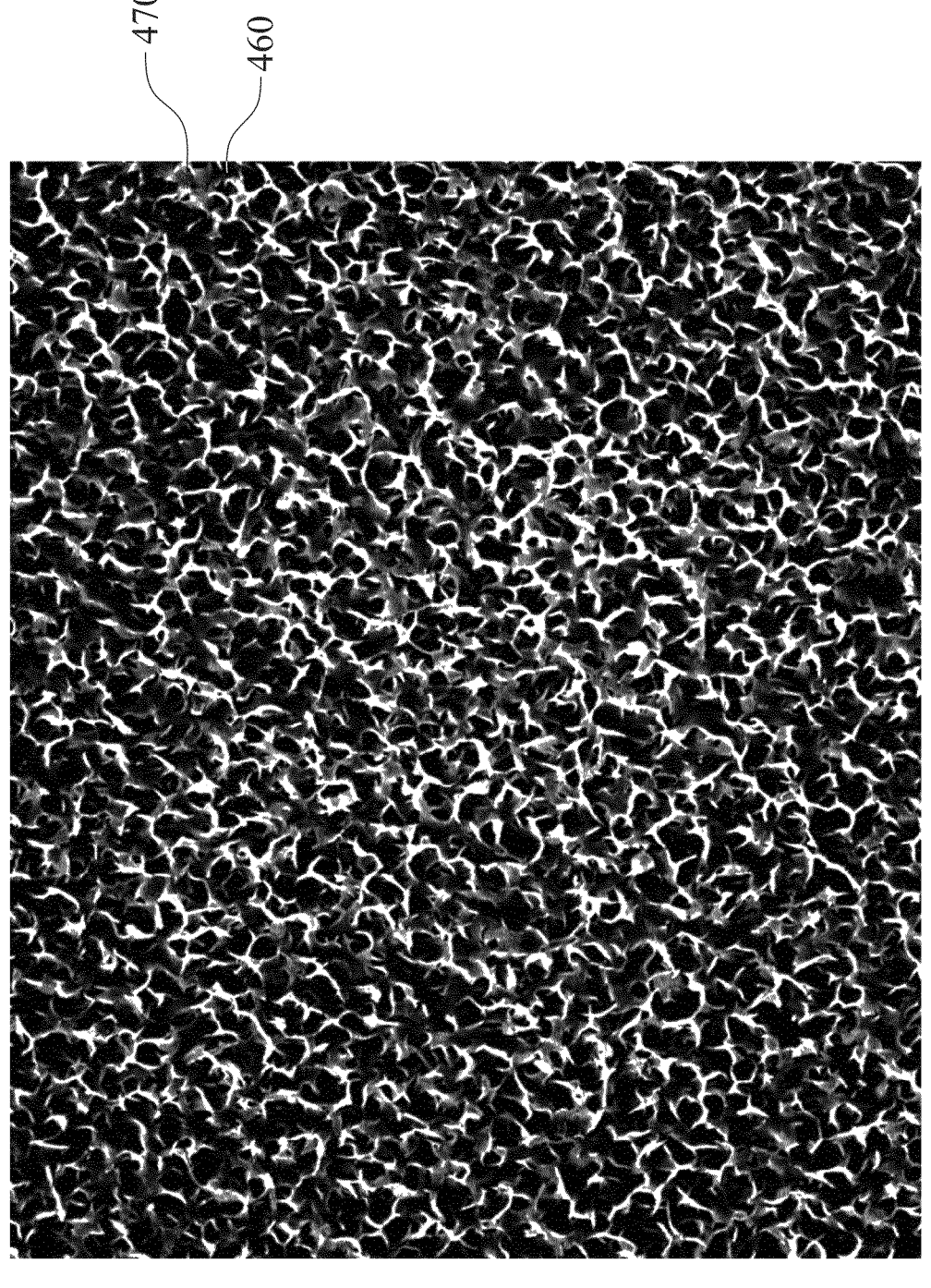
FIG. 1P is an image observed with an electron microscope of a nanostructure layer of the camera module in FIG. 1A.
Figure 1Q:
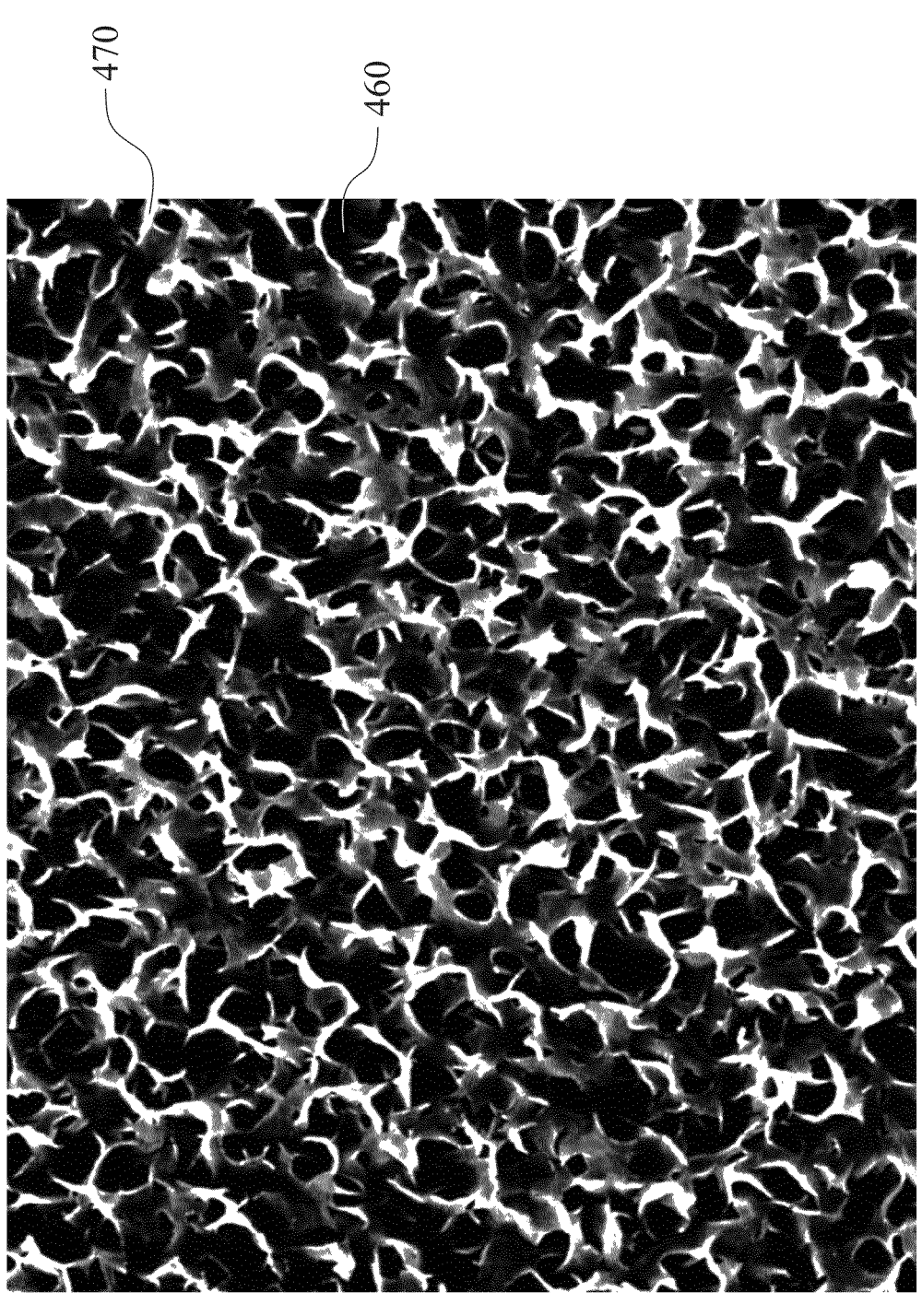
FIG. 1Q is another image observed with the electron microscope of the nanostructure layer of the camera module in FIG. 1A.

FIG. 1N is a schematic view (a relationship drawing between the cross-sectional view and the image-side view) of the third lens element 400 of the camera module 100 in FIG. 1A, and FIG. 1O is a three-dimensional exploded view of the third lens element 400 of the camera module 100 in FIG. 1A. With reference to FIG. 1F to FIG. 1I, FIG. 1N and FIG. 1O, the third lens element 400 of the imaging lens assembly 110 of the camera module 100 includes an optical effective portion 430, a peripheral portion 440, a light-blocking coating layer 450 and a nanostructure layer 470.

With reference to FIG. 1A, the optical axis z passes through the optical effective portion 430 of the third lens element 400. The optical effective portion 430 includes an object-side optical effective surface 431 and an image-side optical effective surface 432. The object-side optical effective surface 431 faces the object side of the imaging lens assembly 110. The image-side optical effective surface 432 faces the image side of the imaging lens assembly 110 and is disposed oppositely to the object-side optical effective surface 431. The peripheral portion 440 of the third lens element 400 surrounds the optical effective portion 430 and includes an object-side peripheral surface 441, an image-side peripheral surface 442 and an outer diameter surface 443. The object-side peripheral surface 441 faces the object side of the imaging lens assembly 110. The image-side peripheral surface 442 faces the image side of the imaging lens assembly 110 and is disposed oppositely to the object-side peripheral surface 441. The outer diameter surface 443 is connected to the object-side peripheral surface 441 and the image-side peripheral surface 442.

With reference to FIG. 1F to FIG. 1I, FIG. 1N and FIG. 1O, the light-blocking coating layer 450 of the third lens element 400 is disposed on at least one surface of the object-side peripheral surface 441 and the image-side peripheral surface 442 and includes a tapered portion 454. The tapered portion 454 is tapered toward a center of the optical effective portion 430, and the tapered portion 454 is tapered adjacent to a boundary 445 between the optical effective portion 430 and the peripheral portion 440. Specifically, the light-blocking coating layer 450 is disposed on the object-side peripheral surface 441 and the image-side peripheral surface 442. The two tapered portions 454 are respectively disposed on the object-side peripheral surface 441 and the image-side peripheral surface 442 and tapered toward the center of the optical effective portion 430. The tapered portion 454 disposed on the object-side peripheral surface 441 is tapered adjacent to the boundary 445 between the object-side optical effective surface 431 and the object-side peripheral surface 441. The tapered portion 454 disposed on the image-side peripheral surface 442 is tapered adjacent to the boundary 445 between the image-side optical effective surface 432 and the image-side peripheral surface 442.

The nanostructure layer 470 of the third lens element 400 is disposed on the optical effective portion 430 and one of the tapered portions 454 of the light-blocking coating layer 450, and the nanostructure layer 470 has a plurality of irregular ridge-shaped protrusions 476. Each of the tapered portions 454 of the light-blocking coating layer 450 forms a light-passing opening 457 adjacent to the corresponding boundary 445 along a direction surrounding the optical axis z. Specifically, there are two nanostructure layers 470. One of the two nanostructure layers 470 is disposed on the object-side optical effective surface 431 and the tapered portion 454 of the light-blocking coating layer 450 of the object-side peripheral surface 441, and the tapered portion 454 forms a light-passing opening 457 adjacent to the corresponding boundary 445 along the direction surrounding the optical axis z. The other of the two nanostructure layers 470 is disposed on the image-side optical effective surface 432 and the tapered portion 454 of the light-blocking coating layer 450 of the image-side peripheral surface 442, the tapered portion 454 forms another light-passing opening 457 adjacent to the corresponding boundary 445 along the direction surrounding the optical axis z, as shown in the upper right enlarged view in FIG. 1N, and the position of the light-passing opening 457 shown in FIG. 1L is the same as or very close to the position of the corresponding boundary 445.

In detail, with reference to FIG. 1N, when a roundness tolerance of each of the light-passing openings 457 is t, the following condition may be satisfied: t<0.02 mm. In addition, the following condition may be satisfied: t<0.01 mm. Furthermore, the following condition may be satisfied: t<0.005 mm. As shown in the upper right enlarged view in FIG. 1N, the light-passing opening 457 is an actual shape of the light-passing opening 457 and different from an ideal light-passing opening shape 457*b* of a regular circle shape, and the roundness tolerance t of the light-passing opening

457 is defined according to the difference between the upper roundness limit t1 and the lower roundness limit t2.

The third lens element 400 may be a glass lens element. Each of the object-side optical effective surface 431 and the image-side optical effective surface 432 of the optical effective portion 430 may be a smooth surface. Each of the object-side peripheral surface 441 and the image-side peripheral surface 442 on which the light-blocking coating layer 450 is disposed may be a smooth surface.

With reference to FIG. 1N, a light-blocking coating layer range 450*a* in the leftmost drawing in FIG. 1N represents the range of the light-blocking coating layer 450 and does not represent the height of the light-blocking coating layer 450. The light-blocking coating layer 450 is further disposed on the outer diameter surface 443. That is, the light-blocking coating layer 450 is disposed on the object-side peripheral surface 441, the image-side peripheral surface 442 and the outer diameter surface 443. Specifically, the light-blocking coating layer 450 is substantially coated on the entire surface of the peripheral portion 440.

With reference to FIG. 1G, FIG. 1I and FIG. 1O, the third lens element 400 further includes a connecting structure layer 460, which is disposed between one of the nanostructure layers 470 and the optical effective portion 430, and between the one of the nanostructure layers 470 and the peripheral portion 440. Specifically, there are two connecting structure layers 460 on the third lens element 400. One of the two connecting structure layers 460 is disposed between the corresponding nanostructure layer 470 and the object-side optical effective surface 431, and between the corresponding nanostructure layer 470 and the object-side peripheral surface 441. The other of the two connecting structure layers 460 is disposed between the corresponding nanostructure layer 470 and the image-side optical effective surface 432, and between the corresponding nanostructure layer 470 and the image-side peripheral surface 442. In addition, it can be said that each of the nanostructure layers 470 is disposed on the topmost layer of the corresponding connecting structure layer 460. Moreover, a material of each of the connecting structure layers 460 may include a non-metal oxide. Each of the connecting structure layers 460 may be composed of and stacked alternately by a plurality of coating layers (three coating layers, specifically) with different refractive indices, and each of the connecting structure layers 460 includes at least one silicon dioxide coating layer.

FIG. 1P is an image observed with an electron microscope (e.g., SEM) of one of the nanostructure layers 470 of the camera module 100 in FIG. 1A, and FIG. 1Q is another image observed with the electron microscope of the nanostructure layer 470 of the camera module 100 in FIG. 1A. With reference to FIG. 1P and FIG. 1Q, the surface of the nanostructure layer 470 of the third lens element 400 has a plurality of hole structures. Parts of the connecting structure layer 460 are exposed from the hole structures, and the exposed parts of the connecting structure layer 460 are in contact with air.

Figure 1R:
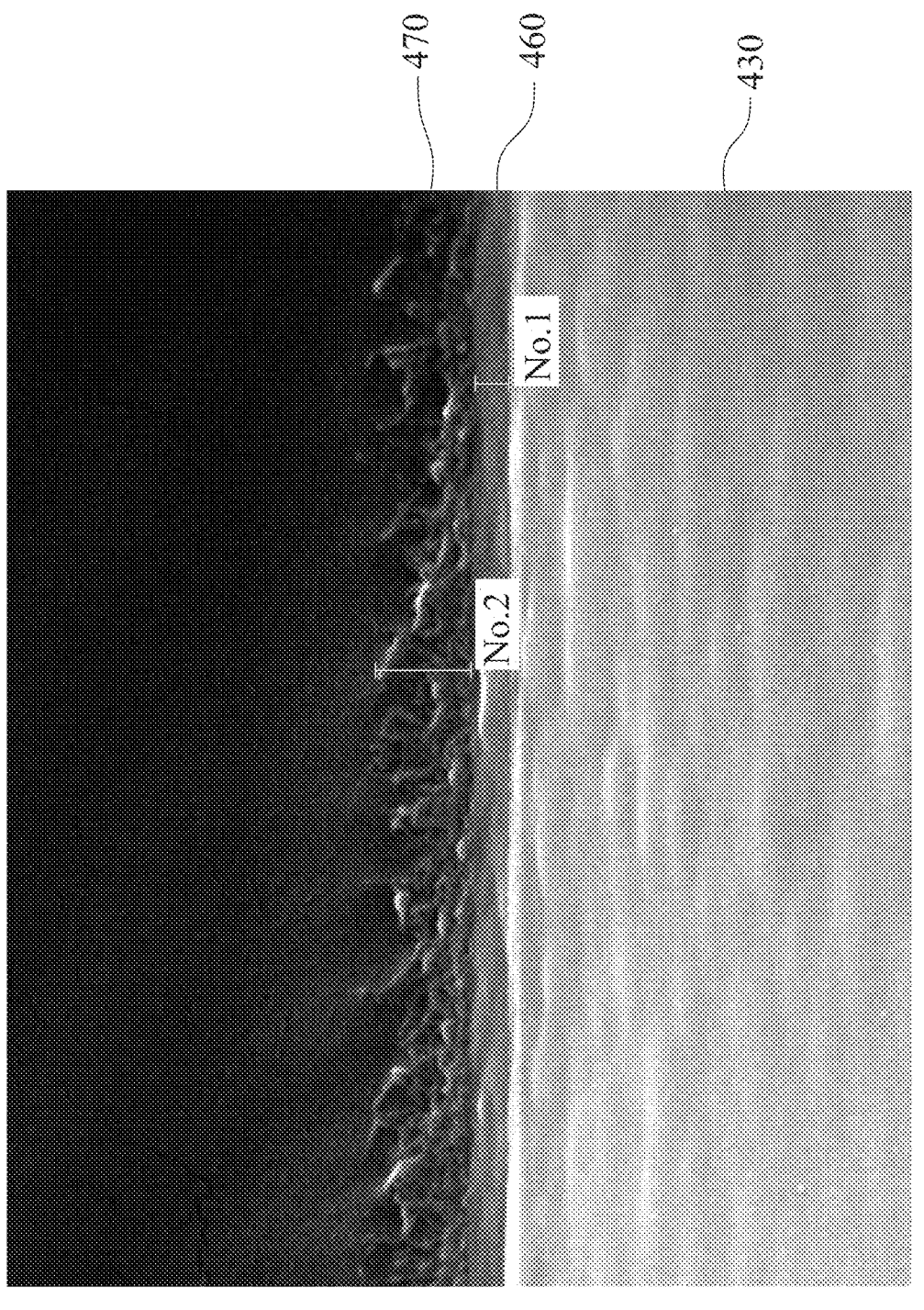
FIG. 1R is a cross-sectional image observed with the electron microscope of the nanostructure layer, a connecting structure layer and an optical effective portion of the camera module in FIG. 1A.
Figure 1S:
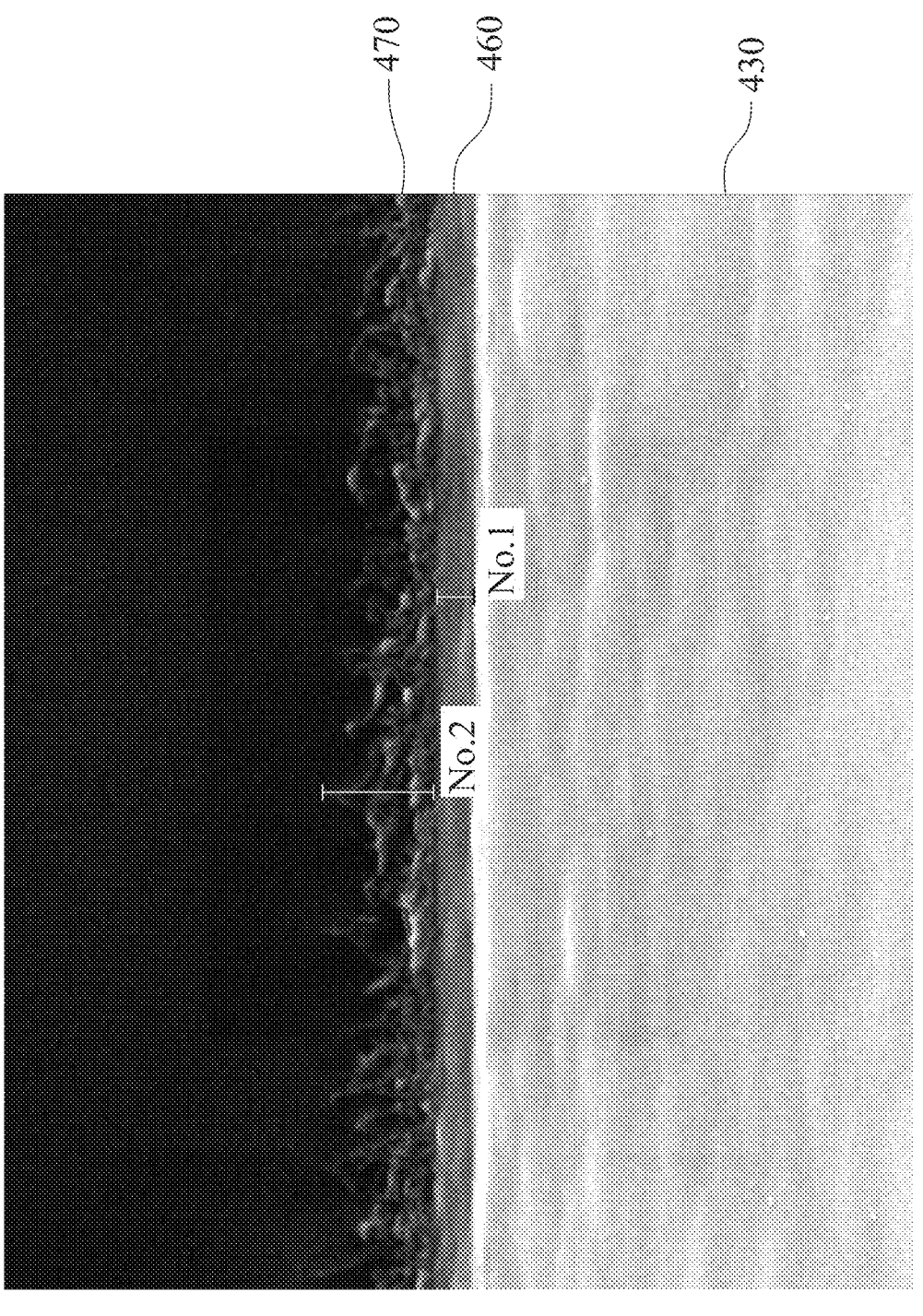
FIG. 1S is another cross-sectional image observed with the electron microscope of the nanostructure layer, the connecting structure layer and the optical effective portion of the camera module in FIG. 1A.
Figure 1T:
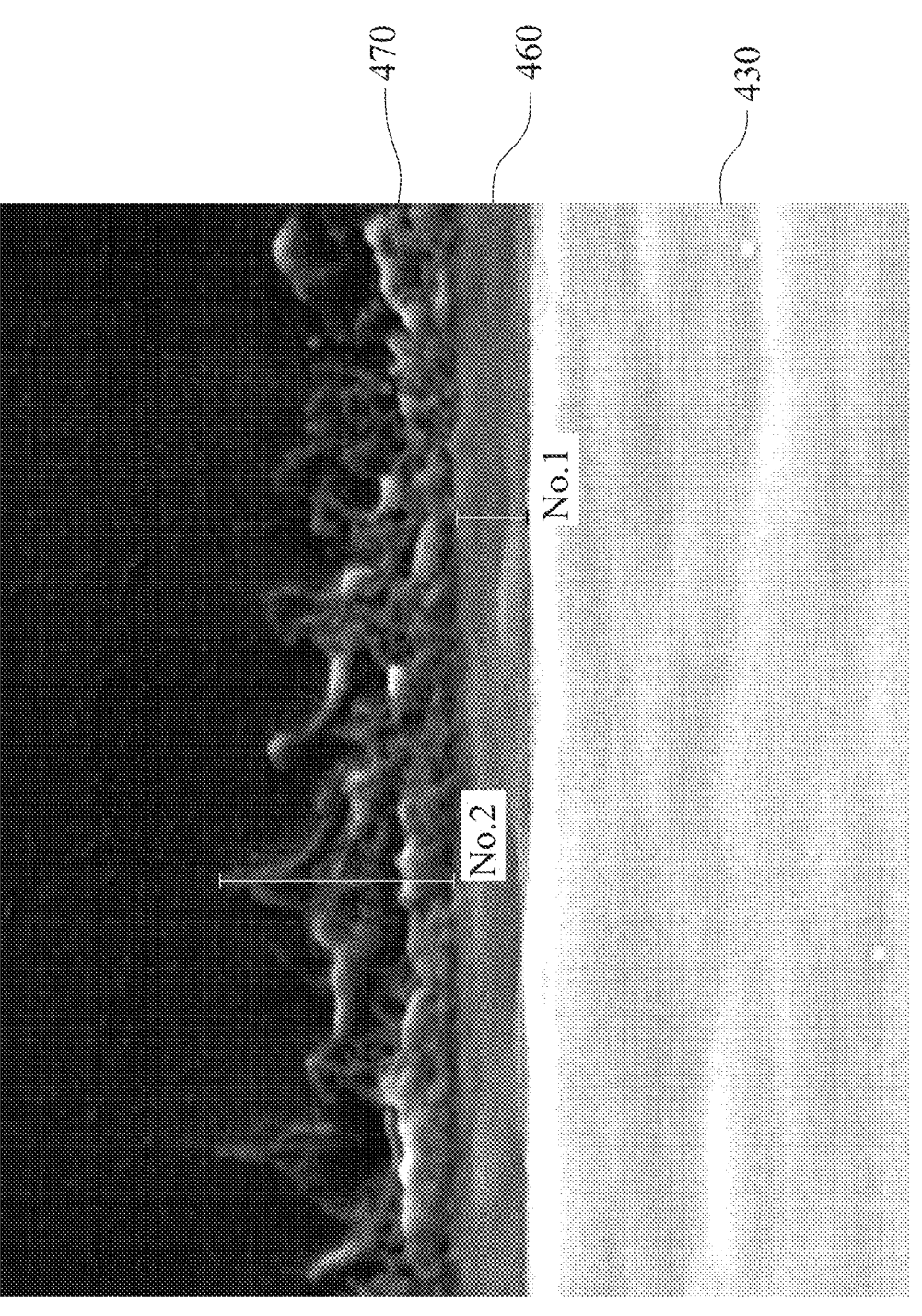
FIG. 1T is further another cross-sectional image observed with the electron microscope of the nanostructure layer, the connecting structure layer and the optical effective portion of the camera module in FIG. 1A.

FIG. 1R is a cross-sectional image observed with the electron microscope of one of the nanostructure layers 470, the corresponding connecting structure layer 460 and the optical effective portion 430 of the third lens element 400 of the camera module 100 in FIG. 1A. FIG. 1S is another cross-sectional image observed with the electron microscope of the nanostructure layer 470, the connecting structure layer 460 and the optical effective portion 430 of the camera module 100 in FIG. 1A. FIG. 1T is further another cross-sectional image observed with the electron microscope of the nanostructure layer 470, the connecting structure layer 460 and the optical effective portion 430 of the camera module 100 in FIG. 1A. With reference to FIG. 1N and FIG. 1R to FIG. 1T, a nanostructure layer range 470*a* in the leftmost drawing in FIG. 1N represents the range of the nanostructure layer 470 and does not represent the height of the nanostructure layer 470. An average height of each of the nanostructure layers 470 may be between 90 nm and 350 nm. Furthermore, the average height of each of the nanostructure layers 470 may be between 125 nm and 300 nm. In addition, the average height of each of the nanostructure layers 470 may be between 195 nm and 255 nm. Moreover, a material of each of the nanostructure layers 470 may include a metal oxide. In the cross-sectional images of the third lens element 400 observed with the electron microscope in FIG. 1R to FIG. 1T, there are the nanostructure layer 470, the connecting structure layer 460 and the optical effective portion 430 from top to bottom in order. Specifically, in FIG. 1R, the height (thickness) No. 1 of the connecting structure layer 460 is 73.68 nm, and the maximum height (maximum thickness) No. 2 of the nanostructure layer 470 is 200.3 nm; in FIG. 1S, the height No. 1 of the connecting structure layer 460 is 76.62 nm, and the maximum height No. 2 of the nanostructure layer 470 is 232.7 nm; and in FIG. 1T, the height No. 1 of the connecting structure layer 460 is 75.15 nm, and the maximum height No. 2 of the nanostructure layer 470 is 247.4 nm.

2nd Embodiment

Figure 2A:
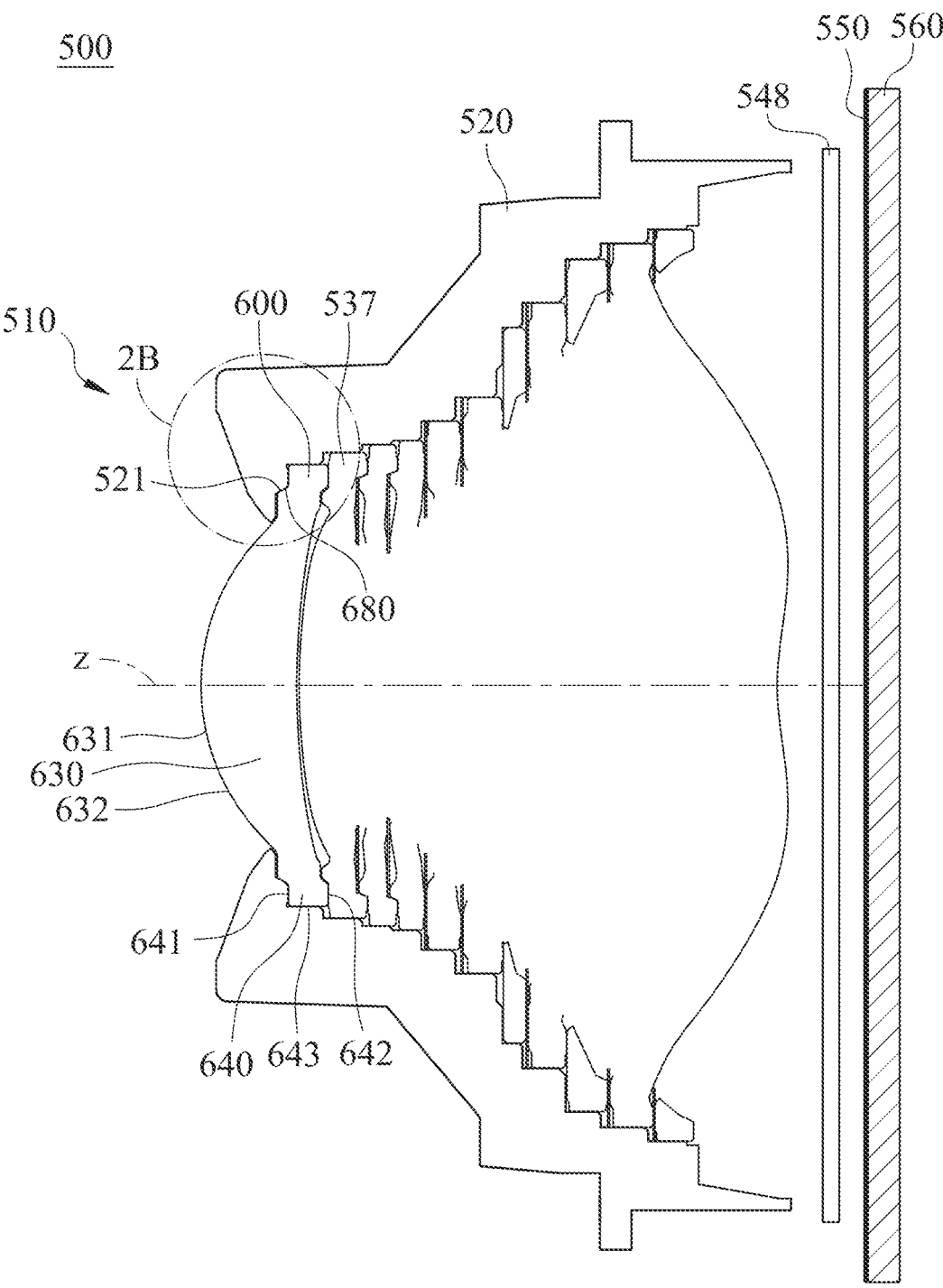
FIG. 2A is a schematic view of a camera module according to the 2nd embodiment of the present disclosure.

FIG. 2A is a schematic view (cross-sectional view) of a camera module 500 according to the 2nd embodiment of the present disclosure. With reference to FIG. 2A, the camera module 500 includes an imaging lens assembly 510, a filter 548 and an image sensor 560. The filter 548 is disposed between the imaging lens assembly 510 and an imaging surface 550 of the camera module 500 (i.e., the imaging surface 550 of the imaging lens assembly 510), and the image sensor 560 is disposed on the imaging surface 550 of the camera module 500. The imaging lens assembly 510 includes a plurality of optical elements (e.g., a first lens element 600, a second lens element 537, a light-blocking sheet, a spacer, a retainer, etc.) and a lens barrel 520, and structures of some of the optical elements are not completely shown in FIG. 2A. The lens barrel 520 accommodates the optical elements, an optical axis z passes through the optical elements, and one optical element of the optical elements is the first lens element 600.

Figure 2B:
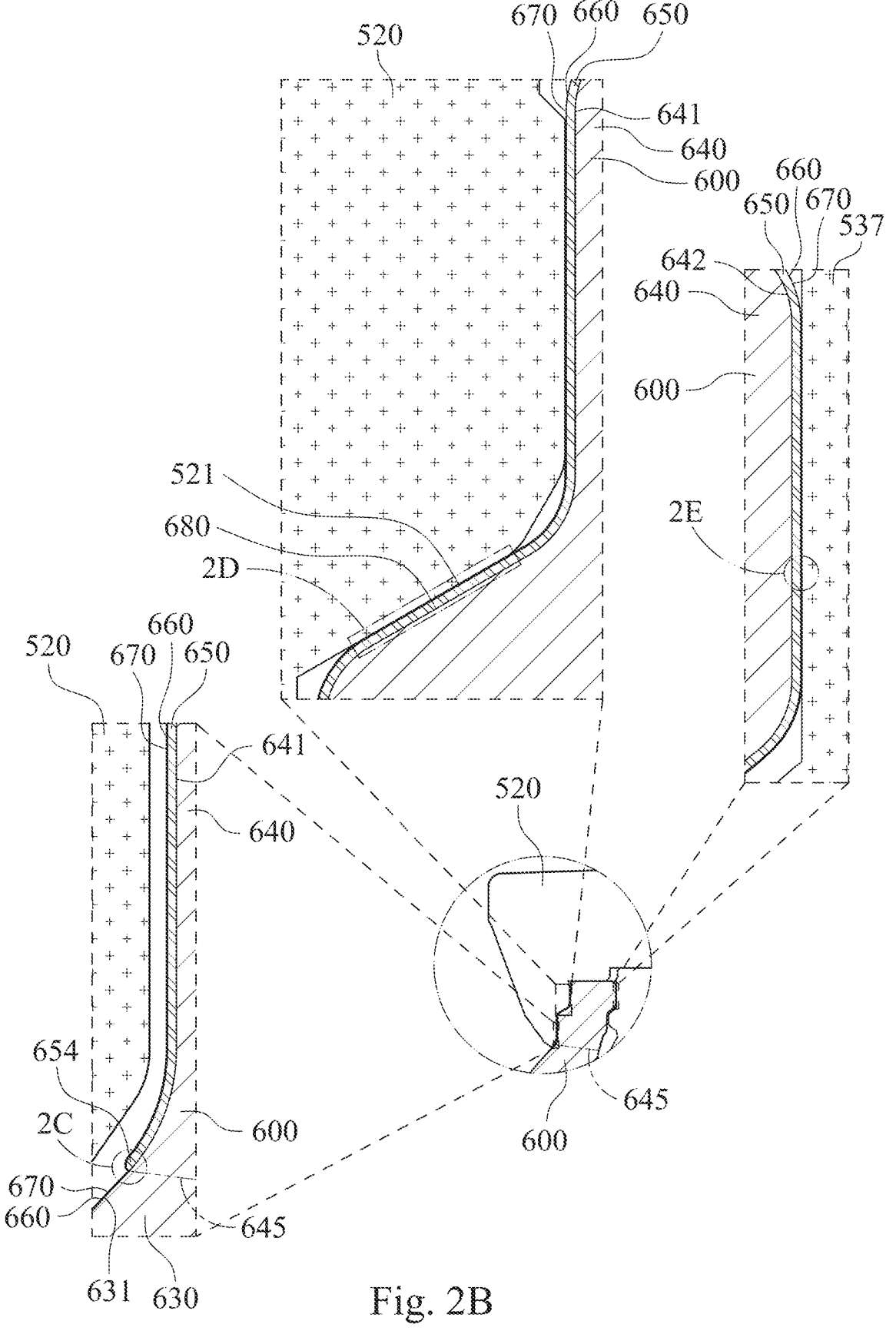
FIG. 2B is an enlarged view of part 2B of the camera module in FIG. 2A.
Figure 2C:
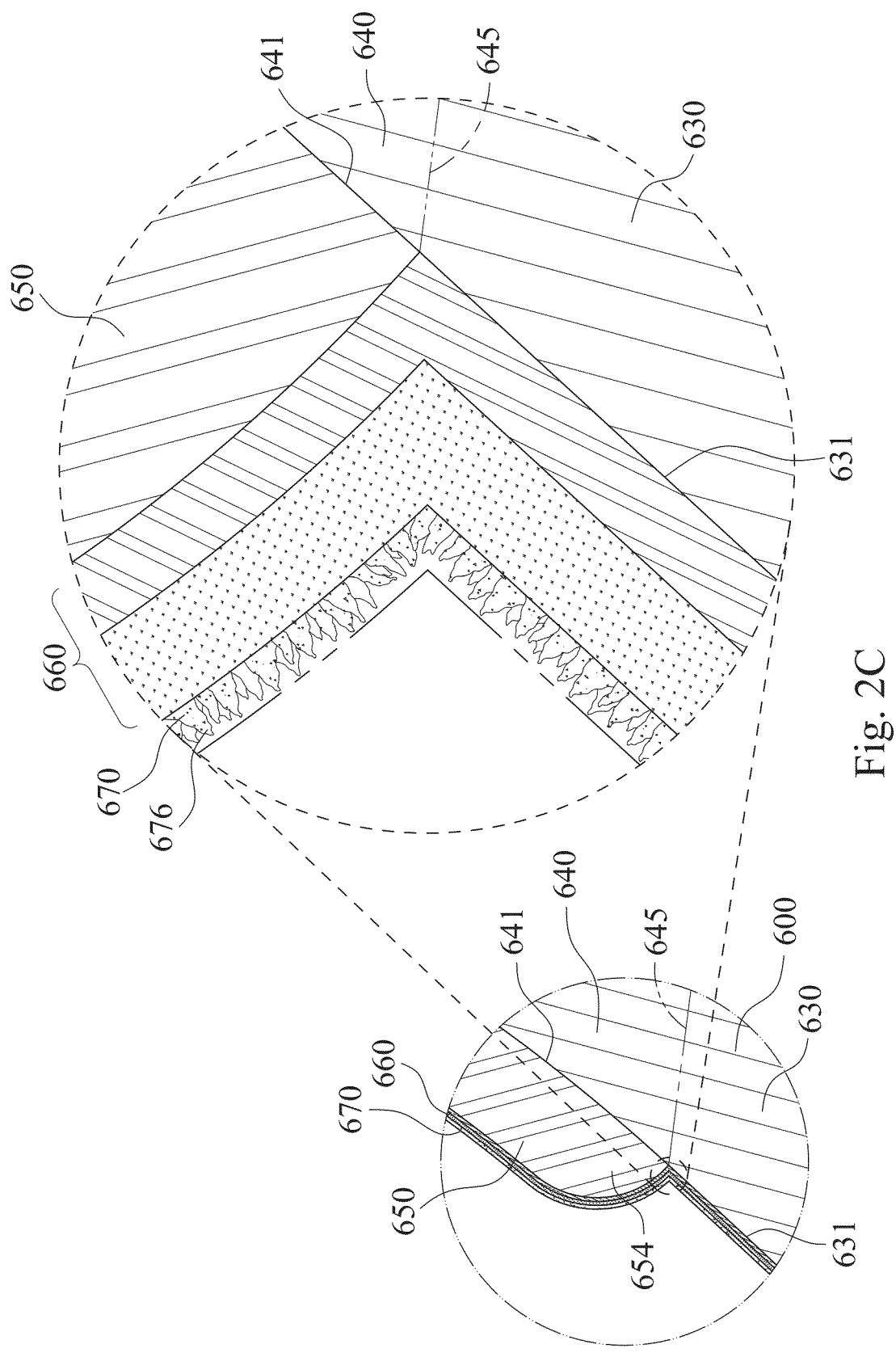
FIG. 2C is an enlarged view of part 2C of the camera module in FIG. 2B.
Figure 2D:
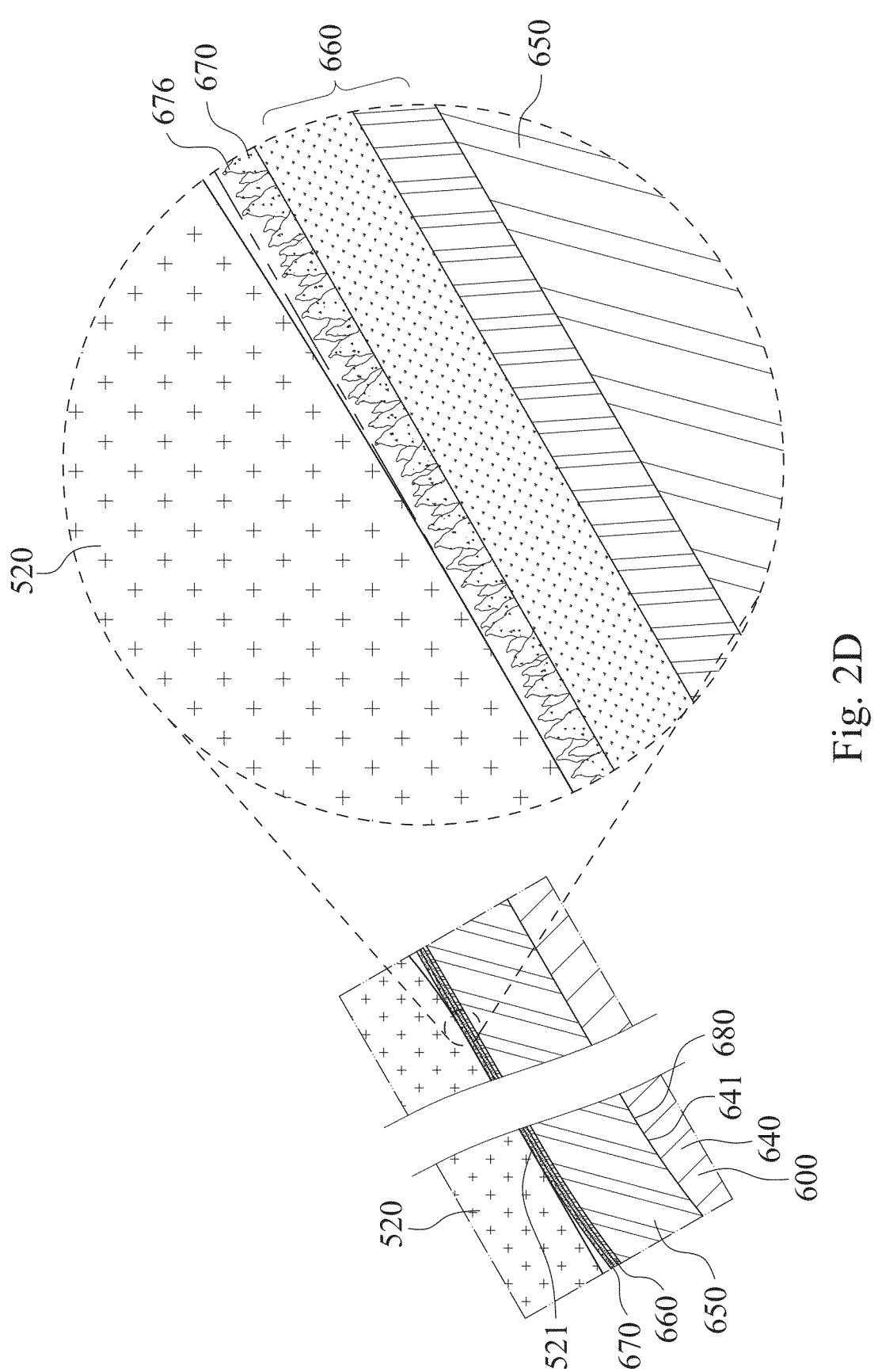
FIG. 2D is an enlarged view of part 2D of the camera module in FIG. 2B.
Figure 2E:
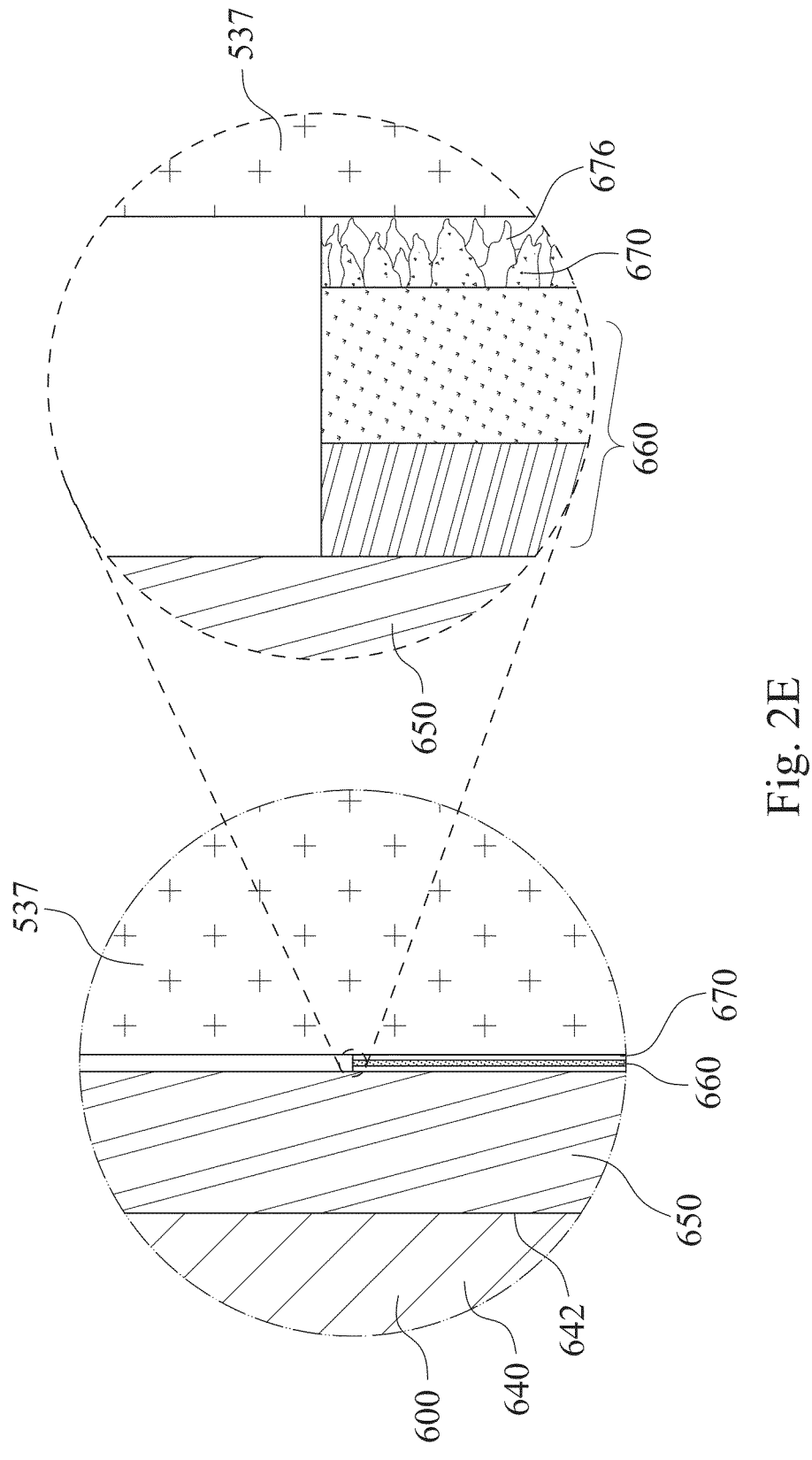
FIG. 2E is an enlarged view of part 2E of the camera module in FIG. 2B.
Figure 2F:
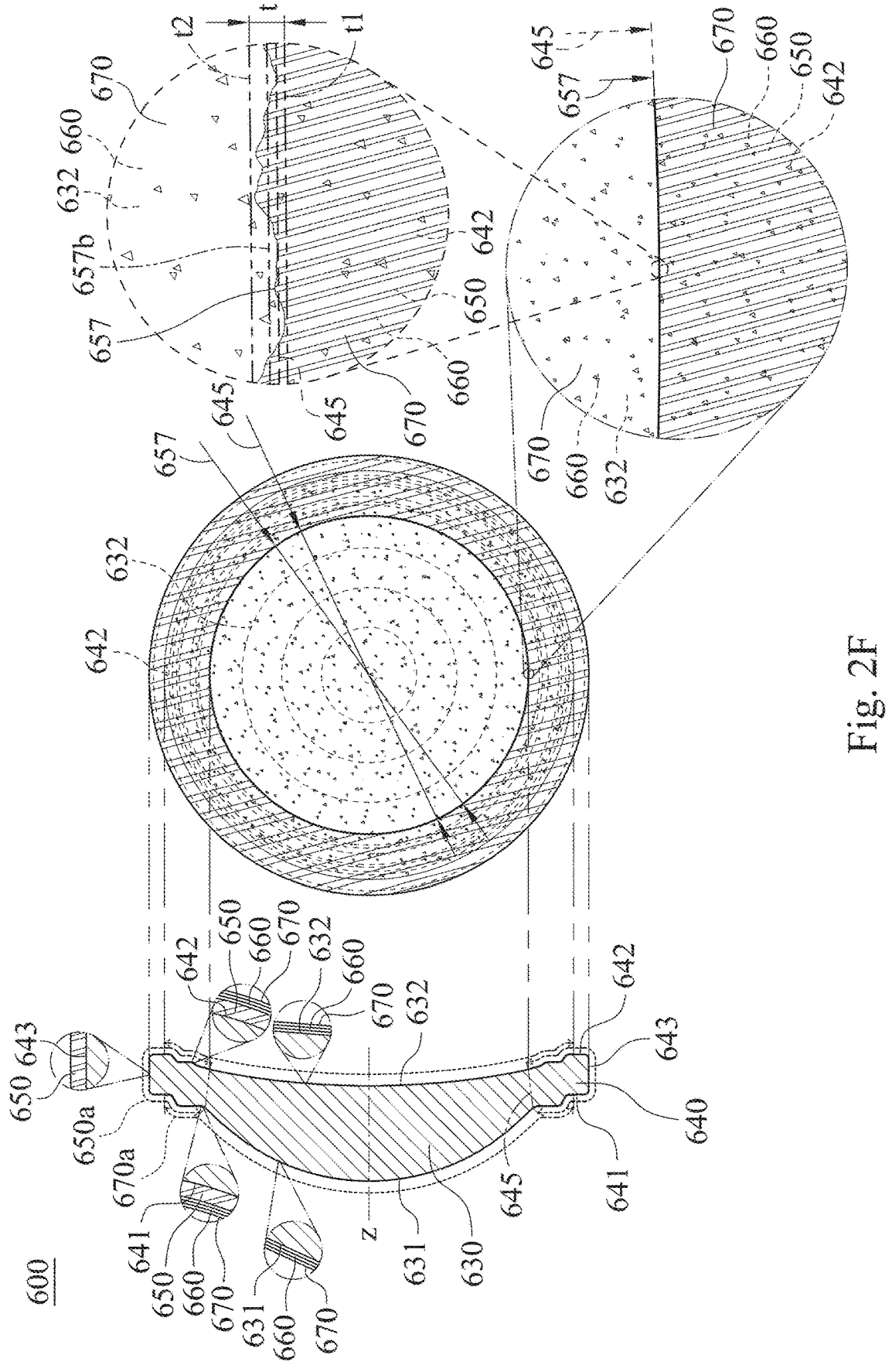
FIG. 2F is a schematic view of a first lens element of the camera module in FIG. 2A.
Figure 2G:
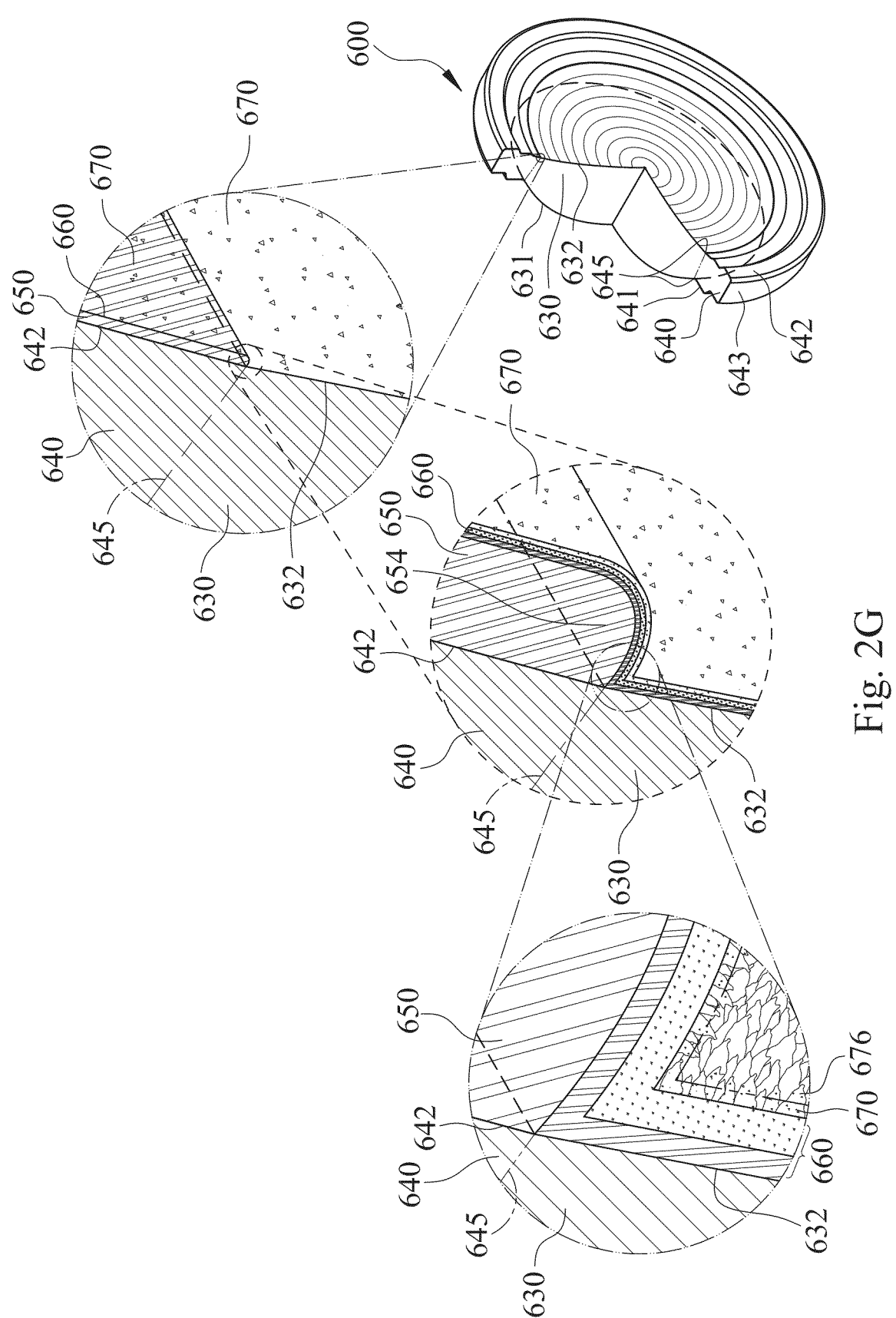
FIG. 2G is a three-dimensional exploded view of the first lens element of the camera module in FIG. 2A.

FIG. 2B is an enlarged view of part 2B of the camera module 500 in FIG. 2A, FIG. 2C is an enlarged view of part 2C of the camera module 500 in FIG. 2B, FIG. 2D is an enlarged view of part 2D of the camera module 500 in FIG. 2B, FIG. 2E is an enlarged view of part 2E of the camera module 500 in FIG. 2B, FIG. 2F is a schematic view (a relationship drawing between the cross-sectional view and the image-side view) of the first lens element 600 of the camera module 500 in FIG. 2A, and FIG. 2G is a three-dimensional exploded view of the first lens element 600 of the camera module 500 in FIG. 2A. With reference to FIG. 2A to FIG. 2G, the first lens element 600 of the imaging lens assembly 510 of the camera module 500 includes an optical effective portion 630, a peripheral portion 640, a light-blocking coating layer 650 and a nanostructure layer 670.

With reference to FIG. 2A, the optical axis z passes through the optical effective portion 630 of the first lens element 600. The optical effective portion 630 includes an object-side optical effective surface 631 and an image-side optical effective surface 632. The object-side optical effective surface 631 faces an object side of the imaging lens assembly 510 (i.e., the left side in FIG. 2A). The image-side optical effective surface 632 faces an image side of the imaging lens assembly 510 (i.e., the right side in FIG. 2A) and is disposed oppositely to the object-side optical effective surface 631. The peripheral portion 640 of the first lens element 600 surrounds the optical effective portion 630 and includes an object-side peripheral surface 641, an image-side peripheral surface 642 and an outer diameter surface 643. The object-side peripheral surface 641 faces the object side of the imaging lens assembly 510. The image-side peripheral surface 642 faces the image side of the imaging lens assembly 510 and is disposed oppositely to the object-side peripheral surface 641. The outer diameter surface 643 is connected to the object-side peripheral surface 641 and the image-side peripheral surface 642.

With reference to FIG. 2B to FIG. 2G, the light-blocking coating layer 650 of the first lens element 600 is disposed on at least one surface of the object-side peripheral surface 641 and the image-side peripheral surface 642 and includes a tapered portion 654. The tapered portion 654 is tapered toward a center of the optical effective portion 630, and the tapered portion 654 is tapered adjacent to a boundary 645 between the optical effective portion 630 and the peripheral portion 640. Specifically, the light-blocking coating layer 650 is disposed on the object-side peripheral surface 641 and the image-side peripheral surface 642. The two tapered portions 654 are respectively disposed on the object-side peripheral surface 641 and the image-side peripheral surface 642 and tapered toward the center of the optical effective portion 630. The tapered portion 654 disposed on the object-side peripheral surface 641 is tapered adjacent to the boundary 645 between the object-side optical effective surface 631 and the object-side peripheral surface 641. The tapered portion 654 disposed on the image-side peripheral surface 642 is tapered adjacent to the boundary 645 between the image-side optical effective surface 632 and the image-side peripheral surface 642.

The nanostructure layer 670 of the first lens element 600 is disposed on the optical effective portion 630 and one of the tapered portions 654 of the light-blocking coating layer 650, and the nanostructure layer 670 has a plurality of irregular ridge-shaped protrusions 676. Each of the tapered portions 654 of the light-blocking coating layer 650 forms a light-passing opening 657 adjacent to the corresponding boundary 645 along a direction surrounding the optical axis z. Specifically, there are two nanostructure layers 670. One of the two nanostructure layers 670 is disposed on the object-side optical effective surface 631 and the tapered portion 654 of the light-blocking coating layer 650 of the object-side peripheral surface 641, and the tapered portion 654 forms a light-passing opening 657 adjacent to the corresponding boundary 645 along the direction surrounding the optical axis z. The other of the two nanostructure layers 670 is disposed on the image-side optical effective surface 632 and the tapered portion 654 of the light-blocking coating layer 650 of the image-side peripheral surface 642, the tapered portion 654 forms another light-passing opening 657 adjacent to the corresponding boundary 645 along the direction surrounding the optical axis z, as shown in the upper right enlarged view in FIG. 2F, and the position of the light-passing opening 657 shown in FIG. 2F is very close to the position of the corresponding boundary 645.

In detail, with reference to FIG. 2F, when a roundness tolerance of each of the light-passing openings 657 is t, the following condition may be satisfied: t<0.02 mm. In addition, the following condition may be satisfied: t<0.01 mm. Furthermore, the following condition may be satisfied: t<0.005 mm. As shown in the upper right enlarged view in FIG. 2F, the light-passing opening 657 is an actual shape of the light-passing opening 657 and different from an ideal light-passing opening shape 657b of a regular circle shape, and the roundness tolerance t of the light-passing opening 657 is defined according to the difference between the upper roundness limit t1 and the lower roundness limit t2.

The first lens element 600 may be a glass lens element. Each of the object-side optical effective surface 631 and the image-side optical effective surface 632 of the optical effective portion 630 may be a smooth surface. Each of the object-side peripheral surface 641 and the image-side peripheral surface 642 on which the light-blocking coating layer 650 is disposed may be a smooth surface.

With reference to FIG. 2F, a light-blocking coating layer range 650a in the leftmost drawing in FIG. 2F represents the range of the light-blocking coating layer 650 and does not represent the height of the light-blocking coating layer 650. The light-blocking coating layer 650 is further disposed on the outer diameter surface 643. That is, the light-blocking coating layer 650 is disposed on the object-side peripheral surface 641, the image-side peripheral surface 642 and the outer diameter surface 643. Specifically, the light-blocking coating layer 650 is substantially coated on the entire surface of the peripheral portion 640.

With reference to FIG. 2C, FIG. 2E and FIG. 2G, the first lens element 600 further includes the connecting structure layer 660, which is disposed between one of the nanostructure layers 670 and the optical effective portion 630, and between the one of the nanostructure layers 670 and the peripheral portion 640. Specifically, there are two connecting structure layers 660 on the first lens element 600. One of the two connecting structure layers 660 is disposed between the corresponding nanostructure layer 670 and the object-side optical effective surface 631, and between the corresponding nanostructure layer 670 and the object-side peripheral surface 641. The other of the two connecting structure layers 660 is disposed between the corresponding nanostructure layer 670 and the image-side optical effective surface 632, and between the corresponding nanostructure layer 670 and the image-side peripheral surface 642. In addition, it can be said that each of the nanostructure layers 670 is disposed on the topmost layer of the corresponding connecting structure layer 660. Moreover, a material of each of the connecting structure layers 660 may include a non-metal oxide. Each of the connecting structure layers 660 may be composed of and stacked alternately by a plurality of coating layers with different refractive indices, and each of the connecting structure layers 660 includes at least one silicon dioxide coating layer.

With reference to FIG. 2C to FIG. 2G, a nanostructure layer range 670a in the leftmost drawing in FIG. 2F represents the range of the nanostructure layer 670 and does not represent the height of the nanostructure layer 670. An 40) Specification-clean copy average height of each of the nanostructure layers 670 may be between 90 nm and 350 nm. Furthermore, the average height of each of the nanostructure layers 670 may be between 125 nm and 300 nm. In addition, the average height of each of the nanostructure layers 670 may be between 195 nm and 255 nm. Moreover, a material of each of the nanostructure layers 670 may include a metal oxide.

With reference to FIG. 2A, FIG. 2B and FIG. 2D, the first lens element 600 further includes an axial connection structure 680, which is disposed on the object-side peripheral surface 641. The lens barrel 520 includes an axial alignment structure 521, which is connected to the axial connection structure 680 so as to cause the first lens element 600 to align the optical axis z, and the lens barrel 520 and the first lens element 600 are fitted and assembled with each other. Furthermore, the light-blocking coating layer 650 of the first lens element 600 is extended from the outer diameter surface 643 to the axial connection structure 680.

3rd Embodiment

Figure 3A:
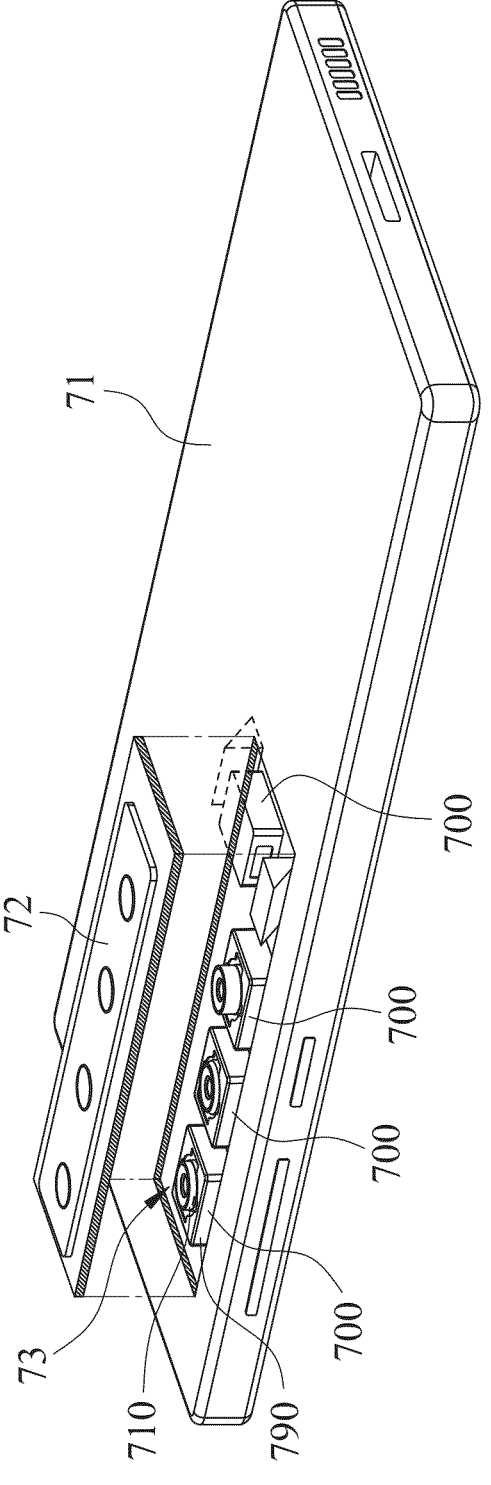
FIG. 3A is a schematic view of an electronic device according to the 3rd embodiment of the present disclosure.
Figure 3B:
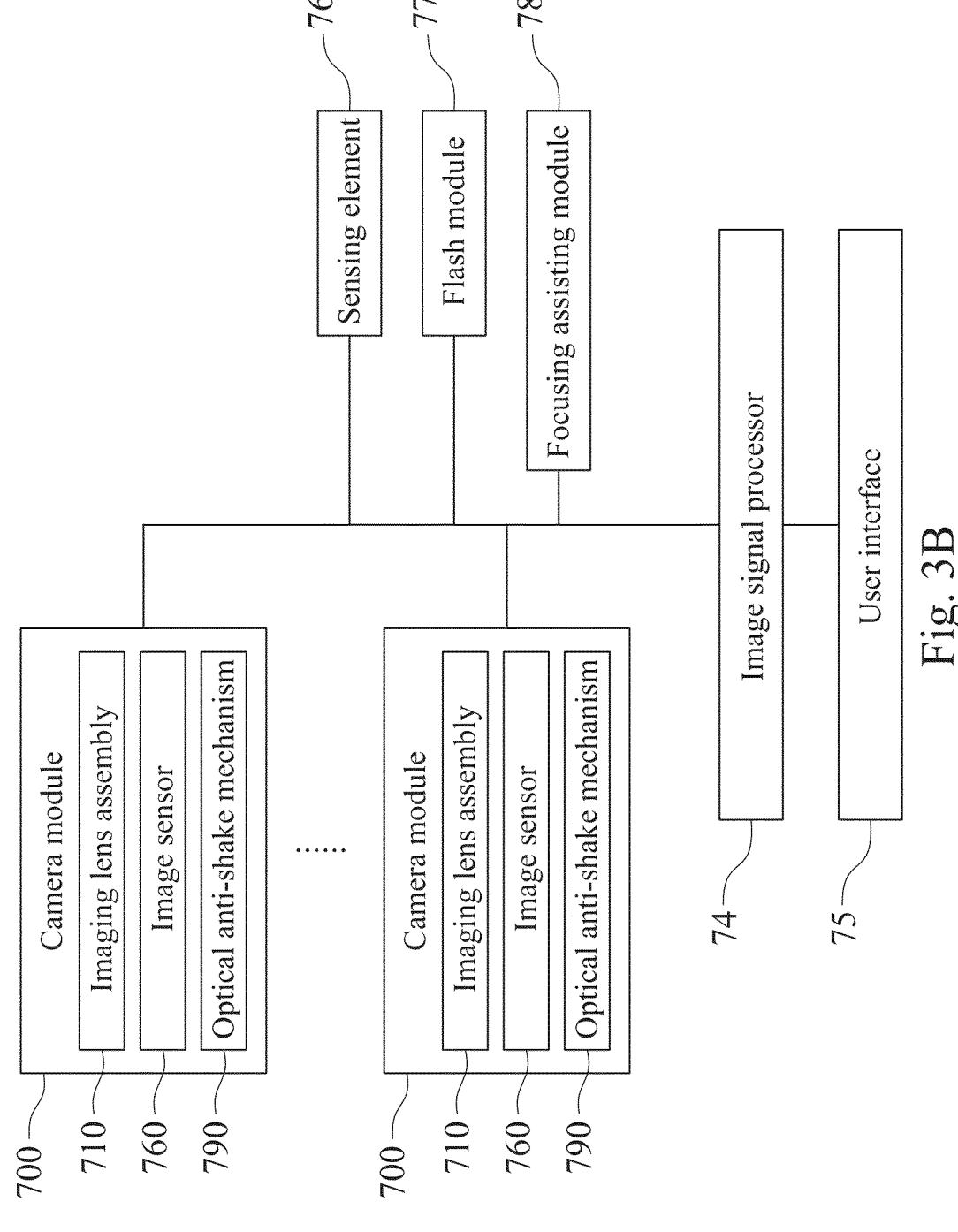
FIG. 3B is a block diagram of the electronic device in FIG. 3A.

FIG. 3A is a schematic view of an electronic device 70 according to the 3rd embodiment of the present disclosure, and FIG. 3B is a block diagram of the electronic device 70 in FIG. 3A. With reference to FIG. 3A and FIG. 3B, the electronic device 70 includes at least one camera module 700, and the camera module 700 includes an imaging lens assembly 710 an image sensor 760, which is disposed on an imaging surface of the camera module 700 (i.e., the imaging surface of the imaging lens assembly 710). The camera module 700 may be the aforementioned camera module 100 of the 1st embodiment, the aforementioned camera module 500 of the 2nd embodiment, or another camera module according to present disclosure.

Specifically, the electronic device 70 is a smart phone and includes four camera modules 700. From a left side to a right side in FIG. 3A, the four camera modules 700 may be respectively include an ultra-wide-angle imaging lens assembly (e.g., the maximum field of view in a range of 93 degrees to 175 degrees), a wide-angle main imaging lens assembly (e.g., the maximum field of view in a range of 65 degrees to 90 degrees), a telephoto imaging lens assembly (e.g., the maximum field of view in a range of 20 degrees to 50 degrees) and an ultra telephoto imaging lens assembly (e.g., the maximum field of view in a range of 5 degrees to 20 degrees) in order, and the maximum field of view of each of the camera modules 700 is not limited thereto. The four camera modules 700 are disposed in an inner space 73 of the electronic device 70, and the light enters the four camera modules 700 via four light entering holes on a lens cover 72 of a housing 71 of the electronic device 70. It should be understood that FIG. 3A is only an exploded schematic view of the lens cover 72 and the inner space 73, and does not mean that the lens cover 72 is separated from the electronic device 70 during a user's operation.

In addition, the electronic device 70 can further include but not be limited to a control unit, a storage unit, a random access memory, a read-only memory, or a combination thereof.

Furthermore, the user activates the capturing mode via the user interface 75 of the electronic device 70. At this moment, the imaging light of the imaging lens assembly 710 is converged on the image sensor 760, and the electronic signal associated with image is output to an image signal processor (ISP) 74.

To meet a specification of a camera of the electronic device 70, the electronic device 70 can further include an optical anti-shake mechanism 790, which can be an optical image stabilization (OIS). Furthermore, the electronic device 70 can further include at least one auxiliary optical element (its reference numeral is omitted) and at least one sensing element 76. According to the 3rd embodiment, the auxiliary optical elements are a flash module 77 and a focusing assisting module 78. The flash module 77 can be configured to compensate a color temperature, and the focusing assisting module 78 can be an infrared distance measurement component, a laser focus module, etc. The sensing element 76 can have functions for sensing physical momentum and kinetic energy, such as an accelerator, a gyroscope, a Hall Effect Element, to sense shaking or jitters applied by hands of the user or external environments. Accordingly, each of the camera modules 700 of the electronic device 70 equipped with an auto-focusing mechanism and the optical anti-shake mechanism 790 can be enhanced to achieve the superior image quality. Furthermore, the electronic device 70 according to the present disclosure can have a capturing function with multiple modes, such as taking optimized selfies, high dynamic range (HDR) under a low light condition, 4K resolution recording, etc. In addition, the users can visually see the captured image through the user interface 75 (i.e., the display screen, the touch screen) and manually operate the view finding range on the user interface 75 to achieve the autofocus function of what you see is what you get.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly, comprising:

a plurality of optical elements, wherein an optical axis passes through the optical elements, and at least one optical element of the optical elements is a lens element; and a lens barrel accommodating the optical elements;

wherein the lens element comprises:

an optical effective portion, wherein the optical axis passes through the optical effective portion, which comprises:

an object-side optical effective surface facing an object side of the imaging lens assembly; and an image-side optical effective surface facing an image side of the imaging lens assembly and disposed oppositely to the object-side optical effective surface;

a peripheral portion surrounding the optical effective portion and comprising:

an object-side peripheral surface facing the object side of the imaging lens assembly;

an image-side peripheral surface facing the image side of the imaging lens assembly and disposed oppositely to the object-side peripheral surface; and an outer diameter surface connected to the object-side peripheral surface and the image-side peripheral surface;

a light-blocking coating layer disposed on at least one surface of the object-side peripheral surface and the image-side peripheral surface and comprising:

a tapered portion tapered toward a center of the optical effective portion, wherein the tapered portion is tapered adjacent to a boundary between the optical effective portion and the peripheral portion;

a nanostructure layer disposed on the optical effective portion and the tapered portion of the light-blocking coating layer, wherein the nanostructure layer has a plurality of irregular ridge-shaped protrusions; and a connecting structure layer disposed between the nanostructure layer and the optical effective portion, and between the nanostructure layer and the peripheral portion;

wherein a surface of the nanostructure layer has a plurality of hole structures, parts of the connecting structure layer are exposed from the hole structures to form exposed parts, and the exposed parts of the connecting structure layer are in contact with air;

wherein the tapered portion of the light-blocking coating layer forms a light-passing opening adjacent to the boundary along a direction surrounding the optical axis, a roundness tolerance of the light-passing opening is t, and the following condition is satisfied:

t<0.02 mm.

2. The imaging lens assembly of claim 1, wherein each of the object-side optical effective surface and the image-side optical effective surface of the optical effective portion is a smooth surface, and the surface of the peripheral portion on which the light-blocking coating layer is disposed is a smooth surface.

3. The imaging lens assembly of claim 1, wherein an average height of the nanostructure layer is between 90 nm and 350 nm.

4. The imaging lens assembly of claim 3, wherein the average height of the nanostructure layer is between 125 nm and 300 nm.

5. The imaging lens assembly of claim 4, wherein the average height of the nanostructure layer is between 195 nm and 255 nm.

6. The imaging lens assembly of claim 1, wherein the roundness tolerance of the light-passing opening is t, and the following condition is satisfied:

t<0.01 mm.

7. The imaging lens assembly of claim 6, wherein the roundness tolerance of the light-passing opening is t, and the following condition is satisfied:

t<0.005 mm.

8. The imaging lens assembly of claim 3, wherein the light-blocking coating layer is further disposed on the outer diameter surface.

9. The imaging lens assembly of claim 8, wherein the light-blocking coating layer is disposed on the object-side peripheral surface, the image-side peripheral surface and the outer diameter surface.

10. The imaging lens assembly of claim 8, wherein the lens element further comprises:

at least one axial connection structure configured for connecting to another optical element of the optical elements adjacent thereto, and for aligning the optical axis with the another optical element adjacent thereto.

11. The imaging lens assembly of claim 10, wherein the light-blocking coating layer is extended from the outer diameter surface to the at least one axial connection structure.

12. A camera module, comprising:

the imaging lens assembly of claim 1.

13. An electronic device, comprising:

the camera module of claim 12, wherein the camera module further comprises an image sensor, which is disposed on an imaging surface of the camera module.

14. An imaging lens assembly, comprising:

a plurality of optical elements, wherein an optical axis passes through the optical elements, and at least one optical element of the optical elements is a lens element; and a lens barrel accommodating the optical elements;

wherein the lens element comprises:

an optical effective portion, wherein the optical axis passes through the optical effective portion, which comprises:

an object-side optical effective surface facing an object side of the imaging lens assembly; and an image-side optical effective surface facing an image side of the imaging lens assembly and disposed oppositely to the object-side optical effective surface;

a peripheral portion surrounding the optical effective portion and comprising:

an object-side peripheral surface facing the object side of the imaging lens assembly;

an image-side peripheral surface facing the image side of the imaging lens assembly and disposed oppositely to the object-side peripheral surface; and an outer diameter surface connected to the object-side peripheral surface and the image-side peripheral surface;

a light-blocking coating layer disposed on at least one surface of the object-side peripheral surface and the image-side peripheral surface and comprising:

a tapered portion tapered toward a center of the optical effective portion, wherein the tapered portion is tapered adjacent to a boundary between the optical effective portion and the peripheral portion;

a nanostructure layer disposed on the optical effective portion and the tapered portion of the light-blocking coating layer, wherein the nanostructure layer has a plurality of irregular ridge-shaped protrusions;

at least one axial connection structure; and a connecting structure layer disposed between the nanostructure layer and the optical effective portion, and between the nanostructure layer and the peripheral portion;

wherein a surface of the nanostructure layer has a plurality of hole structures, parts of the connecting structure layer are exposed from the hole structures to form exposed parts, and the exposed parts of the connecting structure layer are in contact with air;

wherein the lens barrel comprises:

an axial alignment structure connected to the at least one axial connection structure so as to cause the lens element to align the optical axis;

wherein the tapered portion of the light-blocking coating layer forms a light-passing opening adjacent to the boundary along a direction surrounding the optical axis, a roundness tolerance of the light-passing opening is t, and the following condition is satisfied:

t<0.02 mm.

15. The imaging lens assembly of claim 14, wherein each of the object-side optical effective surface and the image-side optical effective surface of the optical effective portion is a smooth surface, and the surface of the peripheral portion on which the light-blocking coating layer is disposed is a smooth surface.

16. The imaging lens assembly of claim 14, wherein an average height of the nanostructure layer is between 90 nm and 350 nm.

17. The imaging lens assembly of claim 16, wherein the average height of the nanostructure layer is between 125 nm and 300 nm.

18. The imaging lens assembly of claim 17, wherein the average height of the nanostructure layer is between 195 nm and 255 nm.

19. The imaging lens assembly of claim 14, wherein the roundness tolerance of the light-passing opening is t, and the following condition is satisfied:

t<0.01 mm.

20. The imaging lens assembly of claim 19, wherein the roundness tolerance of the light-passing opening is t, and the following condition is satisfied:

t<0.005 mm.

21. The imaging lens assembly of claim 14, wherein the lens element is a glass lens element.

22. The imaging lens assembly of claim 16, wherein the light-blocking coating layer is further disposed on the outer diameter surface.

23. The imaging lens assembly of claim 22, wherein the light-blocking coating layer is disposed on the object-side peripheral surface, the image-side peripheral surface and the outer diameter surface.

24. The imaging lens assembly of claim 22, wherein the light-blocking coating layer is extended from the outer diameter surface to the at least one axial connection structure.

25. An imaging lens assembly, comprising:

a plurality of optical elements, wherein an optical axis passes through the optical elements, and at least one optical element of the optical elements is a lens element; and a lens barrel accommodating the optical elements;

wherein the lens element comprises:

an optical effective portion, wherein the optical axis passes through the optical effective portion, which comprises:

an object-side optical effective surface facing an object side of the imaging lens assembly; and an image-side optical effective surface facing an image side of the imaging lens assembly and disposed oppositely to the object-side optical effective surface;

a peripheral portion surrounding the optical effective portion and comprising:

an object-side peripheral surface facing the object side of the imaging lens assembly;

an image-side peripheral surface facing the image side of the imaging lens assembly and disposed oppositely to the object-side peripheral surface; and an outer diameter surface connected to the object-side peripheral surface and the image-side peripheral surface;

a light-blocking coating layer disposed on at least one surface of the object-side peripheral surface and the image-side peripheral surface and comprising:

a tapered portion tapered toward a center of the optical effective portion, wherein the tapered portion is tapered adjacent to a boundary between the optical effective portion and the peripheral portion;

a nanostructure layer disposed on the optical effective portion and the tapered portion of the light-blocking coating layer, wherein the nanostructure layer has a plurality of irregular ridge-shaped protrusions; and a connecting structure layer disposed between the nanostructure layer and the optical effective portion, and between the nanostructure layer and the peripheral portion;

wherein a surface of the nanostructure layer has a plurality of hole structures, parts of the connecting structure layer are exposed from the hole structures to form exposed parts, and the exposed parts of the connecting structure layer are in contact with air;

wherein the tapered portion of the light-blocking coating layer forms a light-passing opening adjacent to the boundary along a direction surrounding the optical axis.

26. The imaging lens assembly of claim 25, wherein each of the object-side optical effective surface and the image-side optical effective surface of the optical effective portion is a smooth surface, and the surface of the peripheral portion on which the light-blocking coating layer is disposed is a smooth surface.

27. The imaging lens assembly of claim 26, wherein an average height of the nanostructure layer is between 90 nm and 350 nm.

28. The imaging lens assembly of claim 27, wherein the average height of the nanostructure layer is between 125 nm and 300 nm.

29. The imaging lens assembly of claim 28, wherein the average height of the nanostructure layer is between 195 nm and 255 nm.

30. The imaging lens assembly of claim 27, wherein a roundness tolerance of the light-passing opening is t, and the following condition is satisfied:

t<0.02 mm.

31. The imaging lens assembly of claim 30, wherein the roundness tolerance of the light-passing opening is t, and the following condition is satisfied:

t<0.01 mm.

32. The imaging lens assembly of claim 31, wherein the roundness tolerance of the light-passing opening is t, and the following condition is satisfied:

t<0.005 mm.

33. The imaging lens assembly of claim 27, wherein a material of the nanostructure layer comprises a metal oxide.

34. The imaging lens assembly of claim 27, wherein a material of the connecting structure layer comprises a non-metal oxide.

* * * * *